US012235598B2

(12) United States Patent
Sugimoto et al.

(10) Patent No.: US 12,235,598 B2
(45) Date of Patent: Feb. 25, 2025

(54) DEVELOPING DEVICE AND IMAGE FORMING APPARATUS

(71) Applicant: CANON KABUSHIKI KAISHA, Tokyo (JP)

(72) Inventors: Sohta Sugimoto, Kanagawa (JP); Shinichi Nishida, Kanagawa (JP); Hiroyuki Munetsugu, Kanagawa (JP); Goshi Ozaki, Kanagawa (JP); Mitsuhiro Sato, Tokyo (JP); Masahiro Suetsugu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/367,029

(22) Filed: Sep. 12, 2023

(65) Prior Publication Data

US 2024/0126188 A1 Apr. 18, 2024

(30) Foreign Application Priority Data

Oct. 12, 2022 (JP) ................................ 2022-164341

(51) Int. Cl.
*G03G 15/08* (2006.01)

(52) U.S. Cl.
CPC ..... *G03G 15/0889* (2013.01); *G03G 15/0874* (2013.01); *G03G 2215/0673* (2013.01)

(58) Field of Classification Search
CPC ........... G03G 15/0867; G03G 15/0874; G03G 15/0877; G03G 15/0886; G03G 15/0889; G03G 2215/0663; G03G 2215/0673
See application file for complete search history.

(56) References Cited

U.S. PATENT DOCUMENTS

| | | | | |
|---|---|---|---|---|
| 11,467,514 B2* | 10/2022 | Sato | .................. | G03G 15/0874 |
| 11,526,099 B2 | 12/2022 | Nogami et al. | | |
| 11,977,344 B2* | 5/2024 | Toba | .................. | G03G 15/0886 |
| 2021/0364948 A1* | 11/2021 | Munetsugu | ........ | G03G 21/1676 |
| 2023/0048810 A1 | 2/2023 | Nogami et al. | | |

FOREIGN PATENT DOCUMENTS

| | | |
|---|---|---|
| JP | 2001-183906 A | 7/2001 |
| JP | 2010-204402 A | 9/2010 |
| JP | 2020-170036 A | 10/2020 |
| JP | 2021-026218 A | 2/2021 |

* cited by examiner

*Primary Examiner* — Hoang X Ngo
(74) *Attorney, Agent, or Firm* — VENABLE LLP

(57) ABSTRACT

A developing device includes an accommodating portion for accommodating toner, a developing roller and a stirring member. The developing device is for use with an image forming apparatus and detachably mounts a replenishing container for replenishing the toner. The accommodating portion includes a receiving opening through which the toner replenished from the accommodating portion is received in the accommodating portion, the receiving opening being provide on a first end side of the accommodating portion with respect to a rotational axis direction of the developing roller. An opening area of the receiving opening when the developing device is viewed in the rotational direction is wider than the opening area of the receiving opening when viewed in a direction perpendicular to the rotational axis direction.

16 Claims, 26 Drawing Sheets

(a)

(b)

(a)

(b)

(a)

(b)

(a)

(b)

DEVELOPING DEVICE AND IMAGE FORMING APPARATUS

FIELD OF THE INVENTION AND RELATED ART

The present invention relates to an image forming apparatus for forming an image on a recording material and a developing device used in the image forming apparatus.

In the image forming apparatus of an electrophotographic method, as a method for replenishing toner (developer) consumed by image formation, a toner replenishing method is known other than a method of replacing a process cartridge or a toner cartridge. In the toner replenishing method, it is possible to achieve downsizing of the image forming apparatus and improvement of usability, etc. by replenishing only the toner from outside the apparatus with a replenishing container which accommodates the toner for replenishing being attached to the image forming apparatus. In Japanese Laid Open Patent Application 2021-26218, a control method for displaying a remaining amount of the toner in the developing device in the image forming apparatus of the toner replenishing method is disclosed.

SUMMARY OF THE INVENTION

An aspect of the present invention is a developing device for use with an image forming apparatus and to which a replenishing container for replenishing toner is detachably mountable, the developing device comprising: an accommodating portion configured to accommodate the toner; a developing roller configured to supply the toner in the accommodating portion to an image bearing member; and a stirring member configured to stir the toner in the accommodating portion, wherein the accommodating portion includes a receiving opening through which the toner replenished from the accommodating portion is received in the accommodating portion, the receiving opening being provided on a first end side of the accommodating portion with respect to a rotational axis direction of the developing roller, and wherein an opening area of the receiving opening when the developing device is viewed in the rotational axis direction is wider than the opening area of the receiving opening when viewed in a direction perpendicular to the rotational axis direction.

According to another aspect of the present invention, there is provided an image forming apparatus to which a replenishing container for replenishing toner is detachably mountable, the image forming apparatus comprising: a developing device including an accommodating portion configured to accommodate the toner, a developing roller configured to supply the toner in the accommodating portion to an image bearing member, and a stirring member configured to stir the toner in the accommodating portion; and a mounting portion provided on a first end side of the accommodating portion with respect to a rotational axis direction of the developing roller and configured to mount the replenishing container, wherein the mounting portion includes a first receiving opening for receiving the toner discharged from the replenishing container, wherein the accommodating portion includes a second receiving opening for receiving the toner flowed from the first receiving opening in the accommodating portion, and wherein in a state in which the toner is capable of being replenished to the accommodating portion through the first receiving opening and the second receiving opening, the first receiving opening is positioned on a second end side opposite to the first end side in the rotational axis direction with respect to a mounting space in which the replenishing container is mounted in the mounting portion, an opening area of the first receiving opening when viewed in the rotational axis direction is wider than an opening area of the first receiving opening when viewed in a direction perpendicular to the rotational axis direction, and the second receiving opening is positioned on the second end side in the rotational axis direction than the first receiving opening and on the first end side in the rotational axis direction than a central position of the accommodating portion in the rotational axis direction.

Further features of the present invention will become apparent from the following description of exemplary embodiments with reference to the attached drawings.

DESCRIPTION OF THE EMBODIMENTS

Hereinafter, Embodiments according to the present invention will be described with reference to the drawings.

Embodiment 1

First, an overview of an image forming apparatus 1 according to an Embodiment 1 will be described using FIG. 2. The image forming apparatus 1 is a monochrome laser printer that forms an image on a recording material P based on an image information input from an external device. The recording material P includes various sheet materials of different materials such as a paper including a plain paper and a thick paper, a plastic film such as a sheet for an overhead projector, a special shaped sheet such as an envelope and an index paper, and cloth.

In the following descriptions and drawings, a vertical upward direction in a case in which the image forming apparatus 1 is installed on a horizontal plane is referred to as a "Z direction". A rotational axis direction of a developing roller 31 which is provided in a developing device 30 of the image forming apparatus 1 is referred to as an "X direction". In addition, a direction crossed with both the X direction and the Z directions is referred to as a "Y direction". The X direction, the Y direction and the Z direction are preferably perpendicular to each other. In addition, as needed, a sign of + or − may be assigned with reference to a direction indicated by an arrow in the Figures. For example, in part (a) of FIG. 1, "+X side" represents the same side as a direction indicated by an arrow X (left side in the Figure), and "−X side" represents the opposite side of the direction indicated by the arrow X (right side in the Figure). In addition, devices and components that are detachably mountable to the image forming apparatus 1 are described with reference to their position and posture as they are mounted on the image forming apparatus 1.

Figure 2:
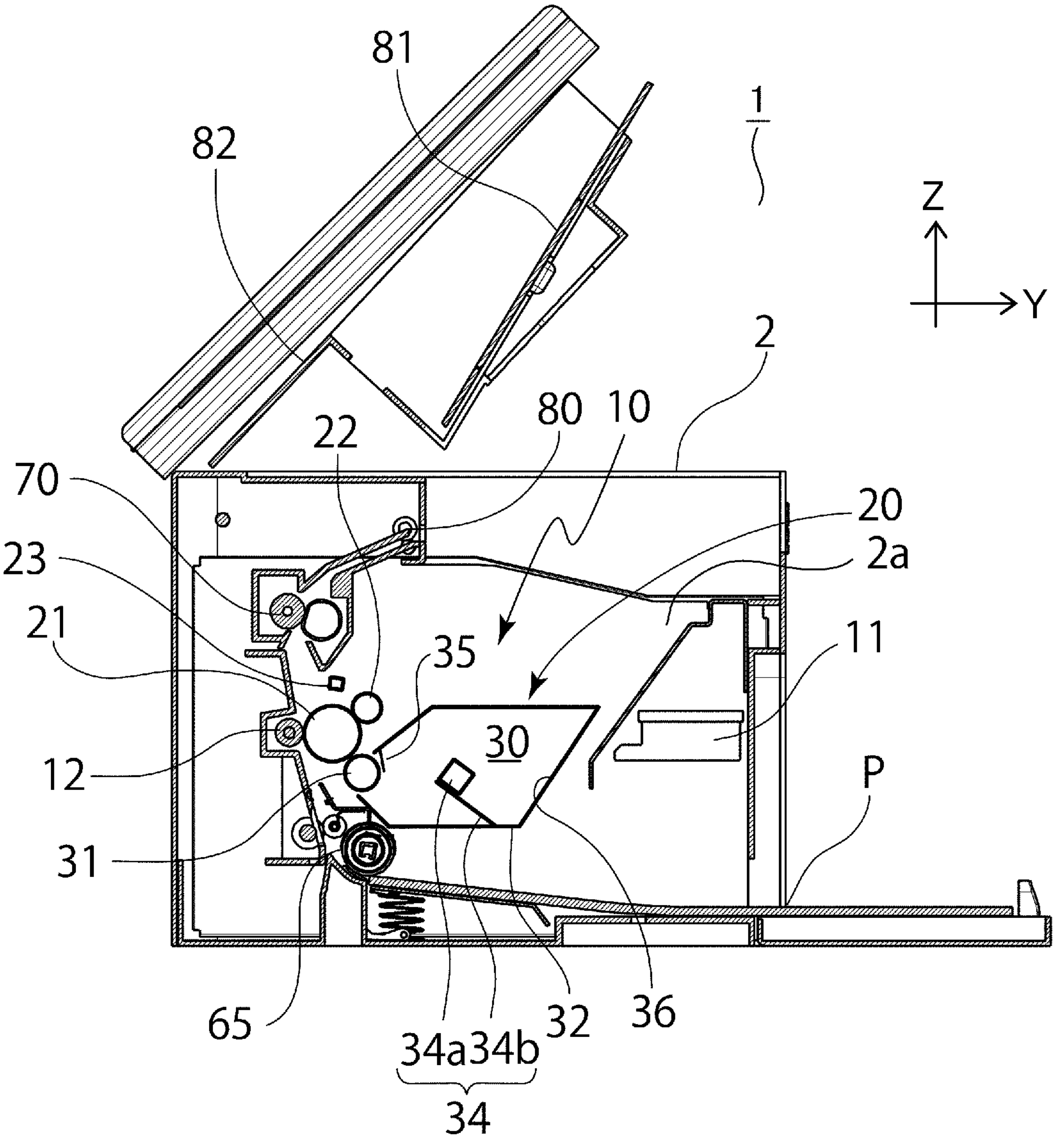
FIG. 2 is a schematic view of an image forming apparatus according to the Embodiment 1.

As shown in FIG. 2, a printer main assembly 2 as the image forming apparatus main assembly (apparatus main assembly) is provided with an image forming portion 10 which forms a toner image on a recording material P, and a fixing portion 70 which fixes the toner image formed by the image forming portion 10 to the recording material P. In addition, the printer main assembly 2 is provided with a pickup roller 65 as a feeding means which feeds the recording material P to the image forming portion 10 and a discharging roller pair 80 as a discharge means which discharges the recording material P on which an image is formed to outside the printer main assembly 2.

The image forming portion 10 is provided with a scanner unit 11, a process unit 20 of an electrophotographic method and a transfer roller 12 as a transfer means which transfers an image (the toner image) formed on a photosensitive drum 21 of the process unit 20 to the recording material P. The process unit 20 is provided with the photosensitive drum 21 as an image bearing member and one or more of process means which act on the image bearing member. The process unit 20 of the present Embodiment is provided with the photosensitive drum 21 and a charging roller 22, a pre-exposure device 23, and a developing device 30, all of which are disposed around the photosensitive drum 21.

The photosensitive drum 21 is a photosensitive member formed in a cylindrical shape (drum-shaped). The photosensitive drum 21 of the present Embodiment is constituted by a photosensitive layer formed of a negatively charged organic photo conductor on a drum-shaped base member molded of aluminum. In addition, the photosensitive drum 21 is driven and rotated by a motor in a predetermined direction (clockwise direction in FIG. 2) at a predetermined process speed.

The charging roller 22 as a charging means contacts the photosensitive drum 21 with a predetermined pressure contact force and forms a charging portion. In addition, a surface of the photosensitive drum 21 is uniformly charged to a predetermined potential by applying a desired charging voltage by a charging high-voltage power source. In the present Embodiment, the photosensitive drum 21 is charged to negative polarity by the charging roller 22. The pre-exposure apparatus 23 eliminates a surface potential of the photosensitive drum 21 before the surface of the photosensitive drum 21 enters the charging portion in order to generate a stable discharge in the charging portion.

The scanner unit 11 as an exposure means exposes the surface of the photosensitive drum 21 by irradiating the photosensitive drum 21 with a laser beam corresponding to image information input from an external device, using a polygon mirror. By this exposure, an electrostatic latent image corresponding to the image information is formed on the surface of the photosensitive drum 21. Incidentally, the scanner unit 11 is not limited to a laser scanner device, and, for example, an LED exposure device including an LED array in which a plurality of LEDs is arranged along a longitudinal direction of the photosensitive drum 21 may be employed.

The developing device 30 as a developing means is provided with a developing roller 31 as a developer carrying member which carries developer, a developer container 32 as an accommodating portion (developer accommodating portion) which accommodates toner as developer, and a stirring member 34 that stirs and conveys the toner in the developer container 32.

The developer container 32 serves as a frame member of the developing device 30. An inside of the developer container 32 is a toner accommodating chamber 36 which serves as an accommodating space of the toner. The developing roller 31 is rotatably supported by the developer container 32. In addition, the developing roller 31 is disposed in an opening portion of the developer container 32 so as to face the photosensitive drum 21. The developing roller 31 rotates about a rotational axis which is substantially parallel to a rotational axis of the photosensitive drum 21. Incidentally, a supply roller (application roller) that contacts the developing roller 31 may be disposed in the developer container 32 to increase a supplying capacity of the toner to the developing roller 31.

The developing device 30 of the present Embodiment uses a contact developing method as a developing method. That is, a toner layer carried on the developing roller 31 is in contact with the photosensitive drum 21 in a developing portion (developing area) where the photosensitive drum 21 and the developing roller 31 face each other. A developing voltage is applied to the developing roller 31 by a developing high-voltage power source. Under application of the developing voltage, the toner carried on the developing roller 31 is transferred from the developing roller 31 to the surface of the photosensitive drum 21 in accordance with a potential distribution on the surface of the photosensitive drum 21, so that the electrostatic latent image is developed into the toner image. Incidentally, in the present Embodiment, a reverse development method is employed. That is, the surface of the photosensitive drum is charged in a charging step and then a charge amount is attenuated by an exposure in an exposure step, and the toner adheres to a surface region of the photosensitive drum 21 having the attenuated charge amount, so that the toner image is formed.

In addition, in the present Embodiment, toner having a particle diameter of 6 m and a normal charging polarity of negative polarity is used, for example. As an example, a polymerized toner produced by a polymerization method is employed as the toner. In addition, the toner does not contain a magnetic component, and is a so-called non-magnetic one-component developer in which the toner is supported on the developing roller 31 mainly by an intermolecular force or an electrostatic force (mirror image force). However, a one-component developer containing a magnetic component may be used. Furthermore, in addition to toner particles, the one-component developer may contain additives (for example, wax or silica fine particles) for adjusting a fluidity and a charging performance of the toner. Furthermore, as the developer, a two-component developer comprising a non-magnetic toner and a magnetic carrier may be used. When a magnetic developer is used, for example, a cylindrical developing roller in which a magnet is arranged inside is used as the developer carrying member.

The stirring member 34 is provided with a shaft portion 34*a* extending in the rotational axis direction (X direction) of the developing roller 31 and a stirring portion 34*b* protruding from the shaft portion 34*a* in a direction crossed with the rotational axis direction. The stirring portion 34*b* is constituted by an elastic sheet-like member having a length extending over approximately an entire length of the toner accommodating chamber 36 in the X direction, for example. The stirring member 34 stirs the toner in the developer container 32 with the stirring portion 34*b* as the shaft portion 34*a* of the stirring member 34 is rotated by a driving force supplied from a motor not shown, and supplies the toner to the developing roller 31. In addition, the stirring member 34 is served to circulate the toner which is not used for developing and is scraped from the developing roller 31 in the developer container 32, and level or uniform the toner in the developer container 32.

Incidentally, the stirring portion 34*b* may be, for example, a plurality of projections (paddles) projecting from the shaft portion 34*a* and disposed in the X direction with being spaced from each other. In addition, the stirring portion 34*b* may be, for example, screw-shaped or propeller-shaped. In addition, the stirring member 34 is not limited to a rotating type. For example, a stirring member including a swinging shape may be employed instead.

In addition, a developing blade 35 that restricts an amount of the toner to be carried on the developing roller 31 is disposed at the opening portion of the developer container 32 in which the developing roller 31 is disposed. The toner supplied to the surface of the developing roller 31 passes through a portion facing the developing blade 35 with the rotation of the developing roller 31, so that the toner is uniformly formed into a thin layer and is charged to the negative polarity by triboelectric charging.

(Image Forming Operation)

Next, an image forming operation of the image forming apparatus 1 will be described. When a command for image formation is input to the image forming apparatus 1, an image forming process by the image forming portion 10 is started based on the image information input from an external computer connected to the image forming apparatus 1. The scanner unit 11 irradiates the photosensitive drum 21 with the laser beam based on the input image information. At this time, the photosensitive drum 21 is pre-charged by the charging roller 22, and the electrostatic latent image is formed on the photosensitive drum 21 by being irradiated with the laser beam. Thereafter, the electrostatic latent image is developed by the developing roller 31, and the toner image is formed on the photosensitive drum 21.

In parallel with the image forming process described above, the recording material P is fed out by the pickup roller 65 and is conveyed toward a transfer nip formed by the transfer roller 12 and the photosensitive drum 21.

Transfer voltage is applied to the transfer roller 12 from a transfer high-voltage power source, and the toner image borne on the photosensitive drum 21 is transferred to the recording material P. When the recording material P on which the toner image is transferred passes through the fixing portion 70, the toner image is heated and pressed. By this, the toner particles are melted and then fixed, so that the toner image is fixed on the recording material P. The recording material P which has passed through the fixing portion 70 is discharged to an outside of the image forming apparatus 1 (outside the machine) by the discharging roller pair 80 as the discharging means, and is stacked on a discharge tray 81 as a stacking portion formed at an upper surface portion of the printer main assembly 2.

The upper surface portion of the printer main assembly 2 is constituted by a top cover 82. Incidentally, in FIG. 2, the top cover 82 is shown in a state opening toward above. On an upper surface of the top cover 82, the discharge tray 81 as a stacking surface is formed. The top cover 82 is supported in an openable and closable (rotatable) manner with respect to a frame member of the printer main assembly 2.

Figure 3:
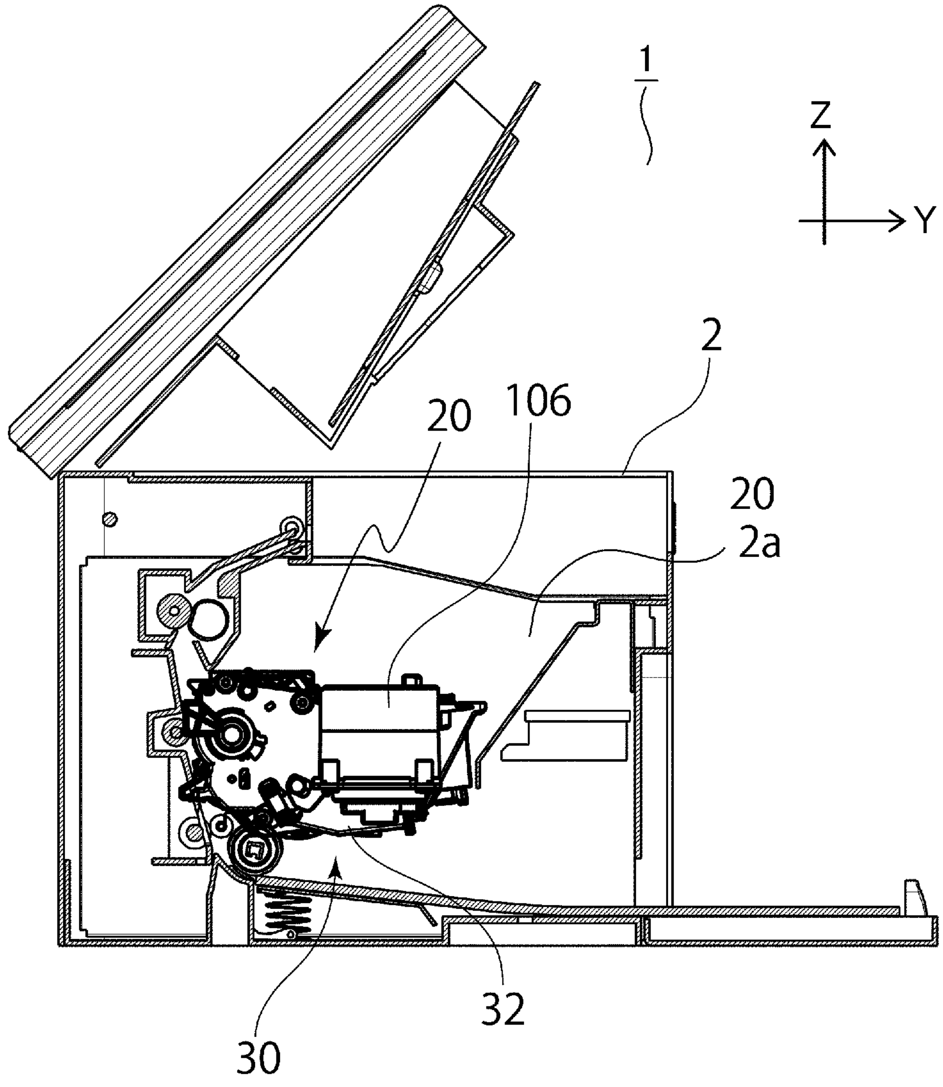
FIG. 3 is a schematic view of the image forming apparatus according to the Embodiment 1.
Figure 26:
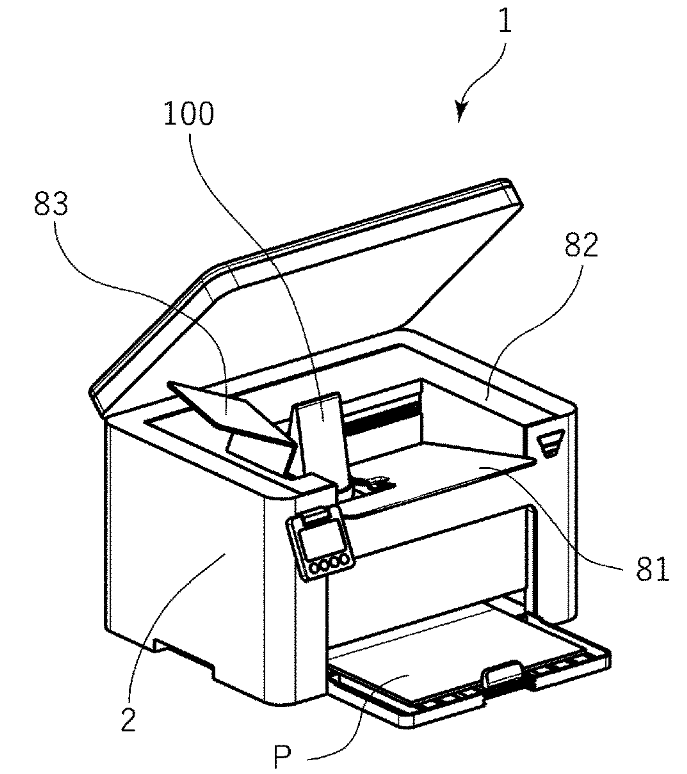
FIG. 26, part (a) and part (b), is a perspective view of an image forming apparatus according to the Modified Example.
Figure 26:
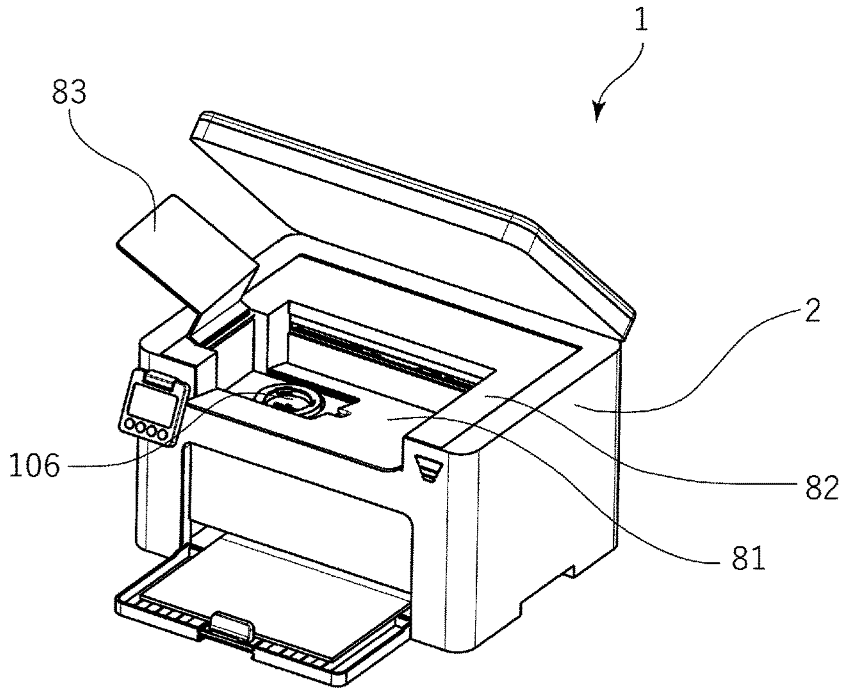

The top cover 82 is movable between a closing position, in which an opening 2*a* is blocked so that a replenishing container cannot be mounted to a toner receiving device 106 (FIG. 3), which will be described below, and an opening position, in which the opening 2*a* is exposed so that the replenishing container can be mounted to the toner receiving device 106. The image forming apparatus 1 is capable of performing the image forming operation in a state in which the top cover 82 is positioned in the closing position. Incidentally, instead of a configuration in which an entire upper surface portion of the printer main assembly 2 is openable and closable, it may be configured so that the toner receiving device 106 is exposed by opening an opening/closing member 83 (part (a) and part (b) of FIG. 26) as a part of the top cover 82.

In the present Embodiment, a toner replenishing method is employed as a replenishing method of the developer to the developing device 30. The image forming apparatus 1 is provided with a remaining amount detecting mechanism such as a remaining amount detecting sensor which detects a remaining amount of the toner in the developer container 32, and when the remaining amount of the toner becomes low, the image forming apparatus 1 informs a user by displaying information which suggests a toner replenishment on an operating portion (display panel), etc. of the image forming apparatus 1 and so forth. Alternatively, the image forming apparatus 1 may also suggest the user replenish the toner by changing a displaying state of a remaining amount displaying portion, etc., which is disposed at a position visible to the user. For example, it is possible to display information on the remaining amount of the toner to the user by providing a lamp (display portion) in the image forming apparatus 1, which changes a lighting state in response to the remaining amount of the toner, and by changing the lighting state. The user can directly replenish the toner to the developing device 30 from outside the image forming apparatus 1 by opening the top cover 82 and mounting a toner pack, which will be described below, to a replenishment port of the toner receiving device 106.

As the remaining amount detecting sensor, an optical sensor may be used, which comprises a sensor substrate that is provided with a light emitting portion and a light receiving portion, and a light guiding member which forms a light path from the light emitting portion through space in the developer container 32 to the light receiving portion. In this case, the remaining amount of the toner can be detected by utilizing a fact that when the stirring member 34 is rotated and a toner surface is leveled, a length of time in which the light path is blocked by the toner changes depending on the remaining amount of the toner. The remaining amount detecting sensor may be disposed so as to detect the toner at or near a longitudinal center M of the toner accommodating chamber 36, which will be described below, so that the remaining amount detecting sensor is less affected by unevenness of the toner in the developer container 32. Incidentally, as a remaining amount detecting mechanism, it is not limited to the optical detecting mechanism using the optical sensor, but a detecting mechanism based on a detection of an electrostatic capacitance of the toner in the developer container 32 may be used. In addition, without disposing of various sensors, etc., a configuration that estimates or calculates the remaining amount of the toner based on the image data formed, e.g., the remaining amount detecting mechanism of the toner based on a pixel count, etc., may be used.

Since a work of cartridge replacement becomes unnecessary, the toner replenishing method improves usability compared to a method in which the process unit 20 (process cartridge) or the developing device 30 (toner cartridge) is replaced when the remaining amount of the toner becomes low. In addition, it is possible to reduce running costs compared to the cartridge method. Incidentally, the image forming apparatus 1 and the replenishing container such as the toner pack which is detachably mountable to the image forming apparatus 1 constitute an image forming system.

In the present Embodiment, by replenishing the toner from outside the image forming apparatus 1 in the toner replenishing method, it becomes possible to use the process unit 20 and the developing device 30 over a service life (lifetime) of the image forming apparatus 1 without replacing the process unit 20 and the developing device 30.

(Toner Receiving Device)

A configuration of the toner receiving device 106 as a mounting portion (replenishing portion) to which the replenishing container is mounted will be described using part (a) and part (b) of FIG. 1, FIG. 4, part (a) and part (b) of FIG. 5, and FIG. 6. In the present Embodiment, the toner receiving device 106 is a unit that constitutes a replenishment port to which a toner pack 100 as an example of the replenishing container is mounted.

Figure 1:
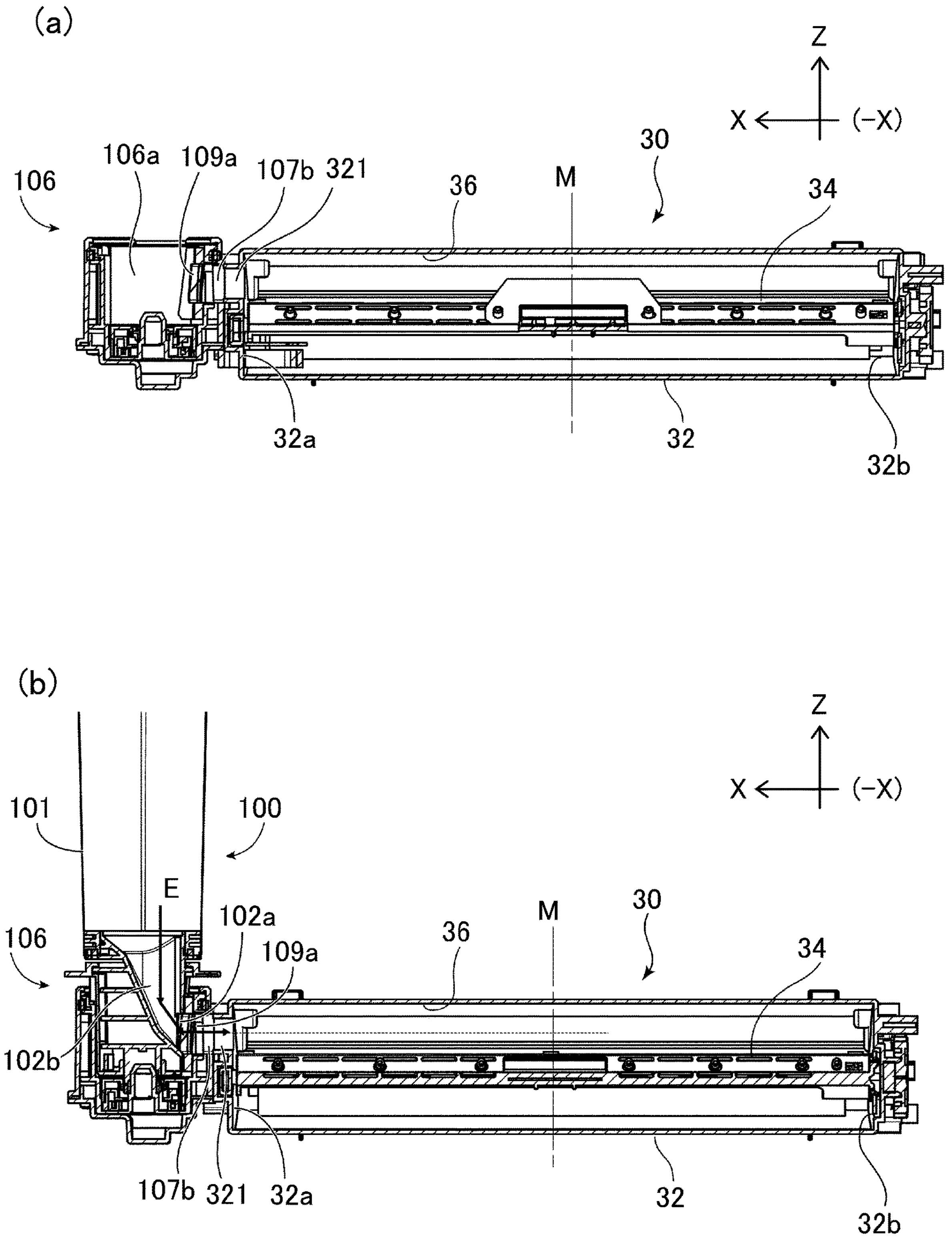
FIG. 1, part (a) and part (b), is a cross sectional view for describing a developing device and a toner receiving device according to an Embodiment 1.

Part (a) of FIG. 1 is a cross-sectional view of a state in which the toner receiving device 106 and toner accommodating chamber 36 are communicated. Part (b) of FIG. 1 is a cross-sectional view illustrating a state in which the toner flows in the toner accommodating chamber 36 from the toner pack 100 mounted to the toner receiving device 106. FIG. 4 is an exploded view of the toner receiving device 106. Part (a) of FIG. 5 is a top view of the toner receiving device 106 when a device-side shutter 109 is in a closing state. Part (b) of FIG. 5 is a top view of the toner receiving device 106 when the device-side shutter 109 is in an opening state. FIG. 6 is a cross-sectional view of the toner receiving device 106 cut with a plane indicated by a H-H line shown in part (a) of FIG. 5.

Figure 4:
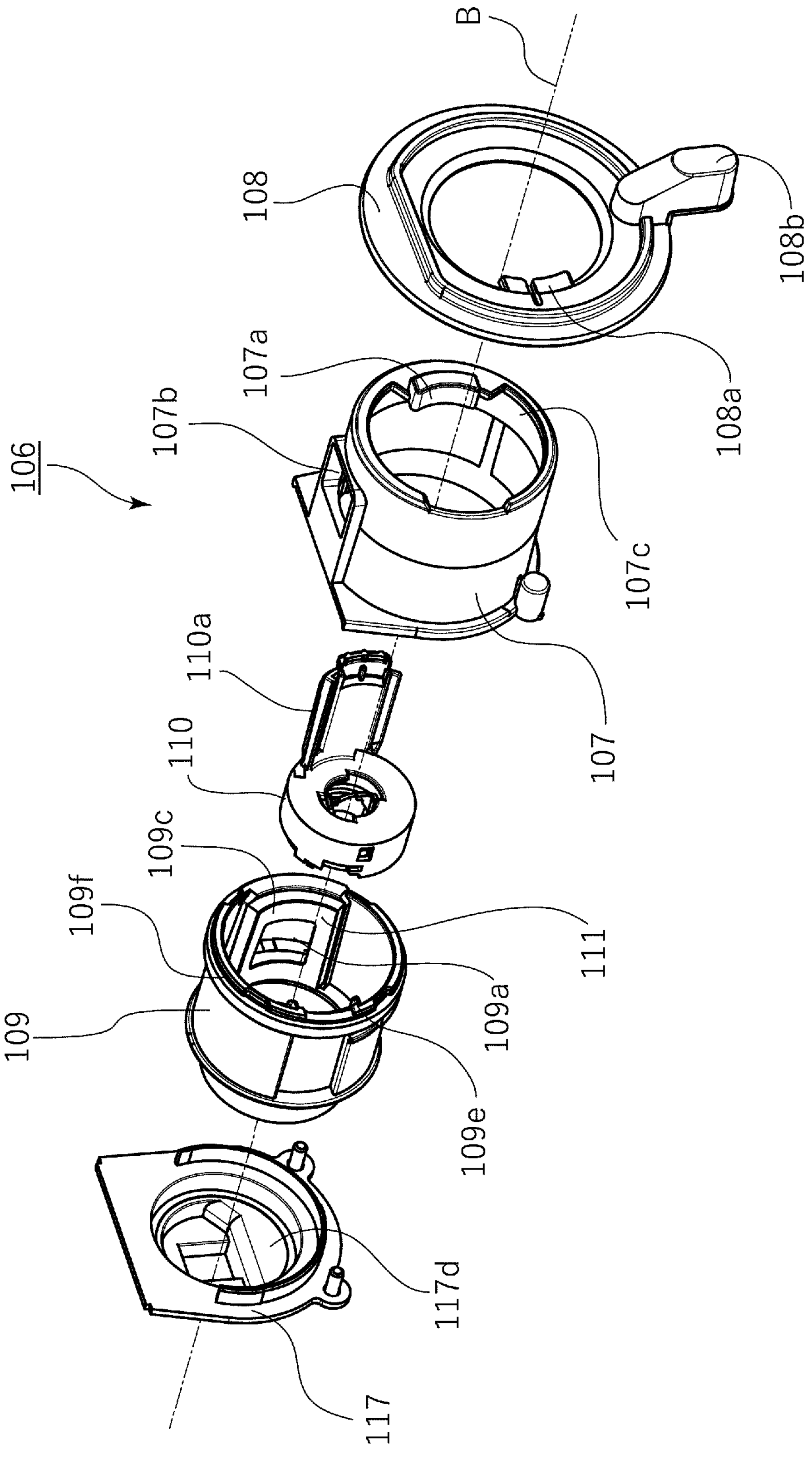
FIG. 4 is an exploded view of the toner receiving device according to the Embodiment 1.

As shown in FIG. 4, the toner receiving device 106 is provided with a first frame member 107, an operating lever 108, a cover member 110, the device-side shutter 109, and a second frame member 117. The first frame member 107, the cover member 110, and the second frame member 117 are fixed members, positions of which are fixed. The operating lever 108 and the device-side shutter 109 are movable members which are movable (rotatable) with respect to the first frame member 107, etc.

The cover member 110 and the second frame member 117 are fixed to the first frame member 107. A discharging opening **107*b* is disposed in the first frame member 107 as a connecting portion (communicating portion) to the developing device 30. The discharging opening 107*b* is an opening through which the toner discharged from the toner pack 100 which is mounted to the toner receiving device 106 passes. In addition, the first frame member 107 includes an inner circumferential cylindrical surface 107*c* that supports the device-side shutter 109 and a positioning portion 107*a* for positioning the toner pack 100**.

As described below, in the developer container 32 (accommodating portion), a receiving opening 321 (part (a) of FIG. 1) as a connecting portion (communicating portion) with the toner receiving device 106 is disposed. The receiving opening 321 is communicated with the discharging opening **107*b* of the toner receiving device 106 and constitutes a flow passage which connects the discharging opening 107*b* and the toner accommodating chamber 36 in the developer container 32**.

The operating lever 108 is an annular member which includes an operating portion **108*b* for the user to operate with a finger and a drive transmitting portion 108*a* which transmits force received by the operating portion 108*b***.

The device-side shutter 109 is an example of a shutter member. The device-side shutter 109 includes a receiving opening **109*a* which communicates with a discharging opening 102*a* of the toner pack 100, which will be described below, a drive transmitted portion 109*e*, which engages with the drive transmitting portion 108*a* of the operating lever 108, and an outer circumferential cylindrical surface 109*f*. A device-side seal 111 is attached around the receiving opening 109*a***.

The cover member 110 includes a shielding portion **110*a* which is projecting into space inside the device-side shutter 109. The shielding portion 110*a* is disposed at a position where it is possible to shield the receiving opening 109*a* in response to a position of the device-side shutter 109**.

A mounting space **106*a* is formed approximately as a bottomed cylindrical space by the first frame member 107, the operating lever 108, the device-side shutter 109, and the cover member 110**.

The device-side shutter 109 is configured to rotate about a rotational axis B by the outer circumferential surface **109*f* being slidably supported by the inner circumferential surface 107*c* of the first frame member 107. By an engagement of the drive transmitting portion 108***a* and the drive transmitted portion 109*e*, the device-side shutter 109 rotates integrally with the operating lever 108. In addition, as shown in FIG. 6, a movement of the device-side shutter 109 in a direction along an axis B is restricted by a restricting surface 107*d* of the first frame member 107 and a restricting surface 117*d* of the second frame member 117.

Figure 5:
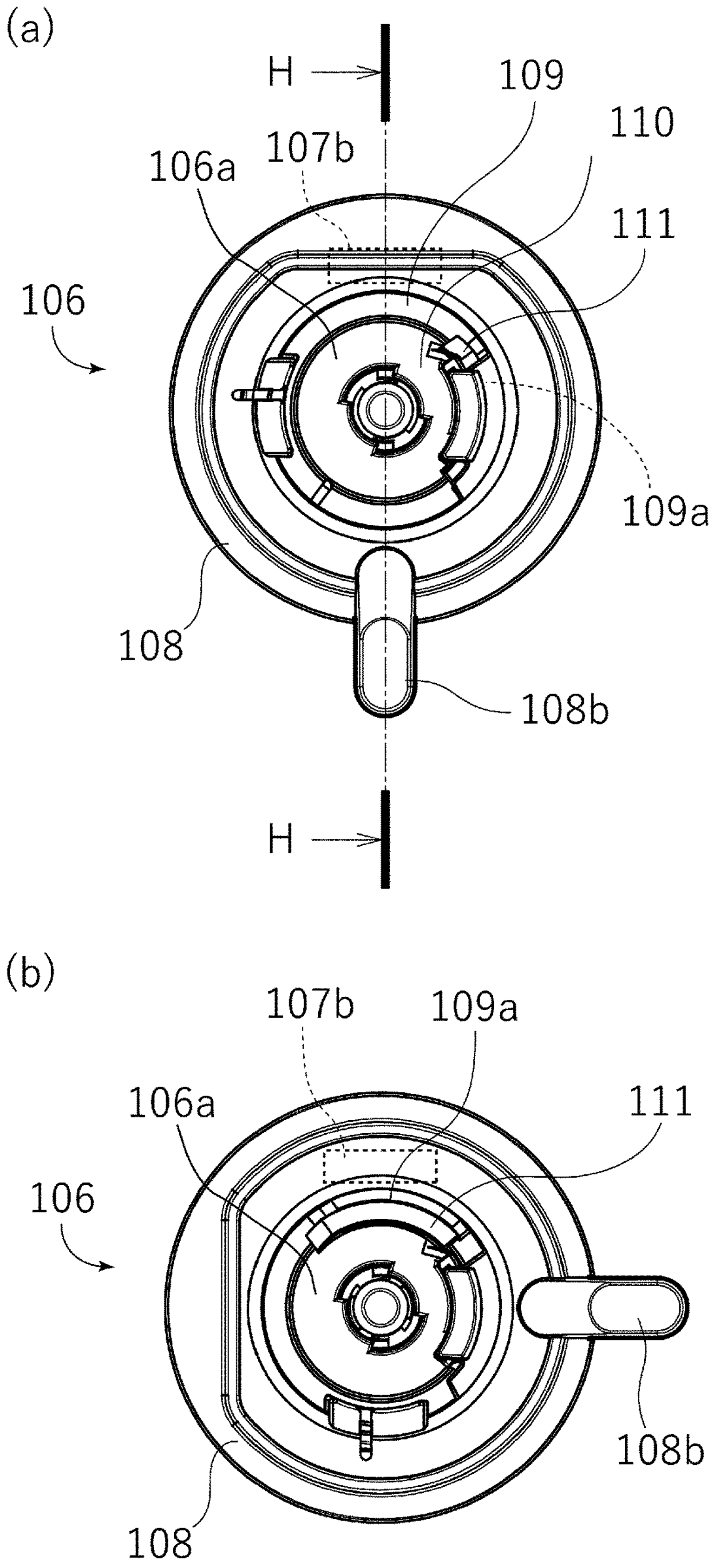
FIG. 5, part (a) and part (b), is a top view of the toner receiving device according to the Embodiment 1.
Figure 6:
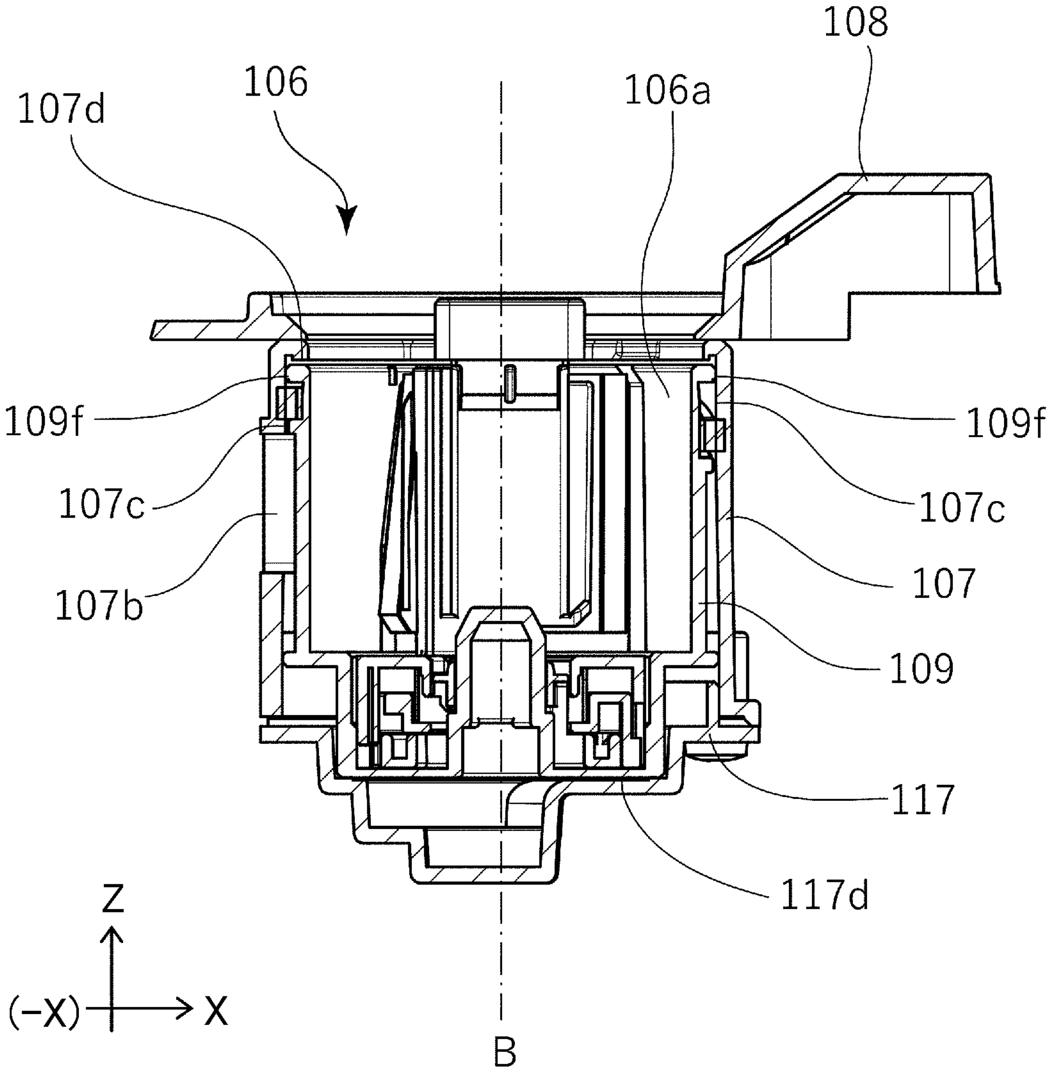
FIG. 6 is a cross-sectional view of the toner receiving device according to the Embodiment 1.

The device-side shutter 109 is movable between a closing position (first position) shown in part (a) of FIG. 5 and an opening position (second position) shown in part (b) of FIG. 5. When the device-side shutter 109 is positioned in the closing position, the receiving opening 109*a* is shielded by the shielding portion 110*a* of the cover member 110 and is separated from the discharging opening 107*b*. In other words, the receiving opening 109*a* is not communicated with an inner space of the developing device 30.

When the device-side shutter 109 is positioned in the opening position, the receiving opening 109*a* is away from the shielding portion 110*a* of the cover member 110 and is faced to or aligned with the discharging opening 107*b*. In other words, the receiving opening 109*a* is in a state in which the receiving opening 109*a* is communicating with the inner space of the developer container 32 through the discharging opening 107*b* and the receiving opening 321 of the developer container 32. Therefore, when the device-side shutter 109 is positioned in the second position and the inner space of the toner pack 100 is communicated with the receiving opening 109*a* of the device-side shutter 109, the toner replenishment from the toner pack 100 to the developing device 30 becomes possible.

In other words, when the device-side shutter 109 is positioned in the opening position, the image forming apparatus 1 becomes in a state where the toner replenishment to the developer container 32 through the receiving opening 109*a* (first receiving opening) of the device-side shutter 109 and the receiving opening 321 (second receiving opening) of the developer container 32 is possible. On the other hand, when the device-side shutter 109 is positioned in the closing position, the image forming apparatus 1 is in a state in which the toner replenishment to the developer container 32 is not possible.

(Toner Pack)

Figure 7:
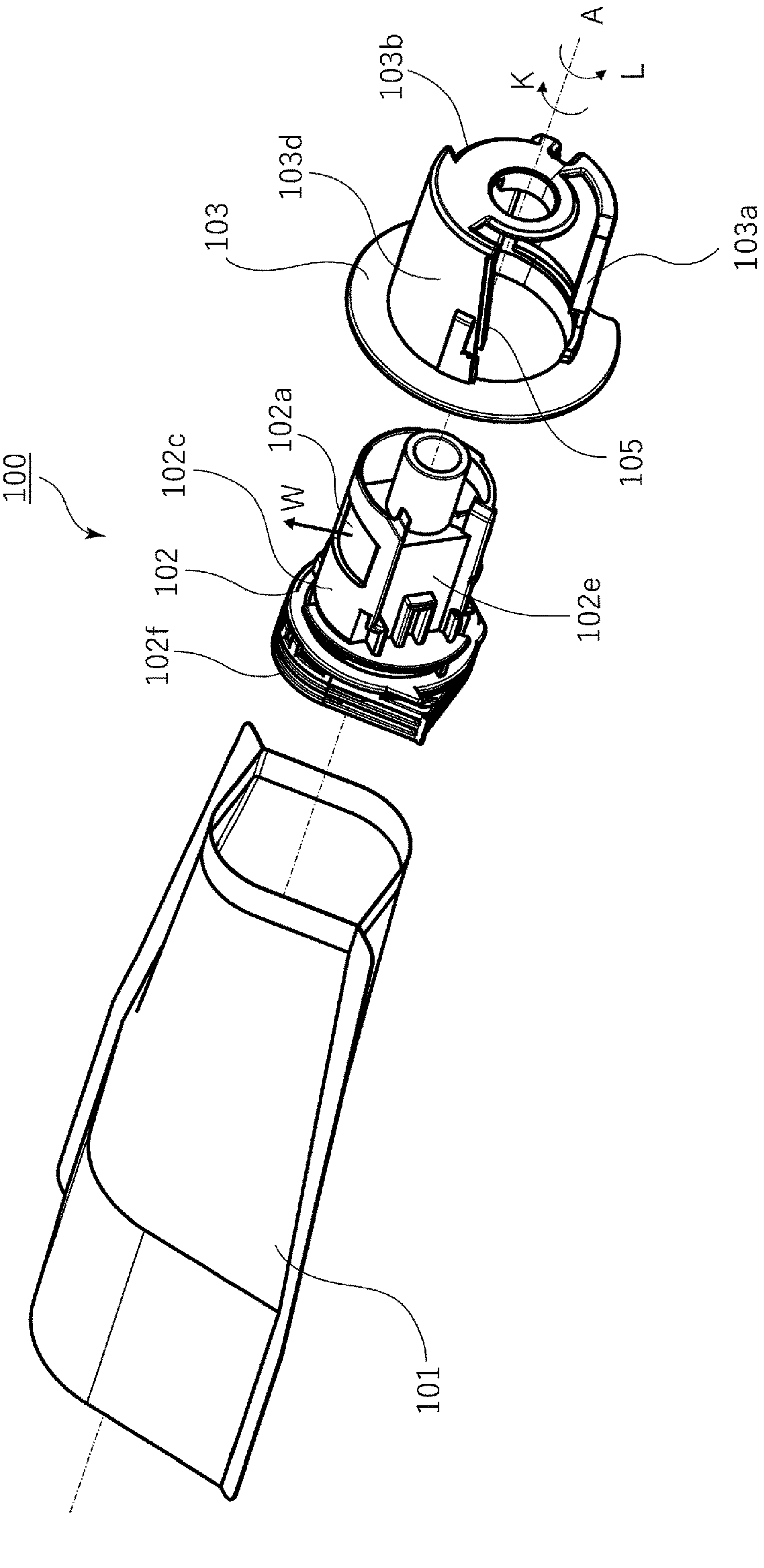
FIG. 7 is an exploded view of a toner pack according to the Embodiment 1.
Figure 8:
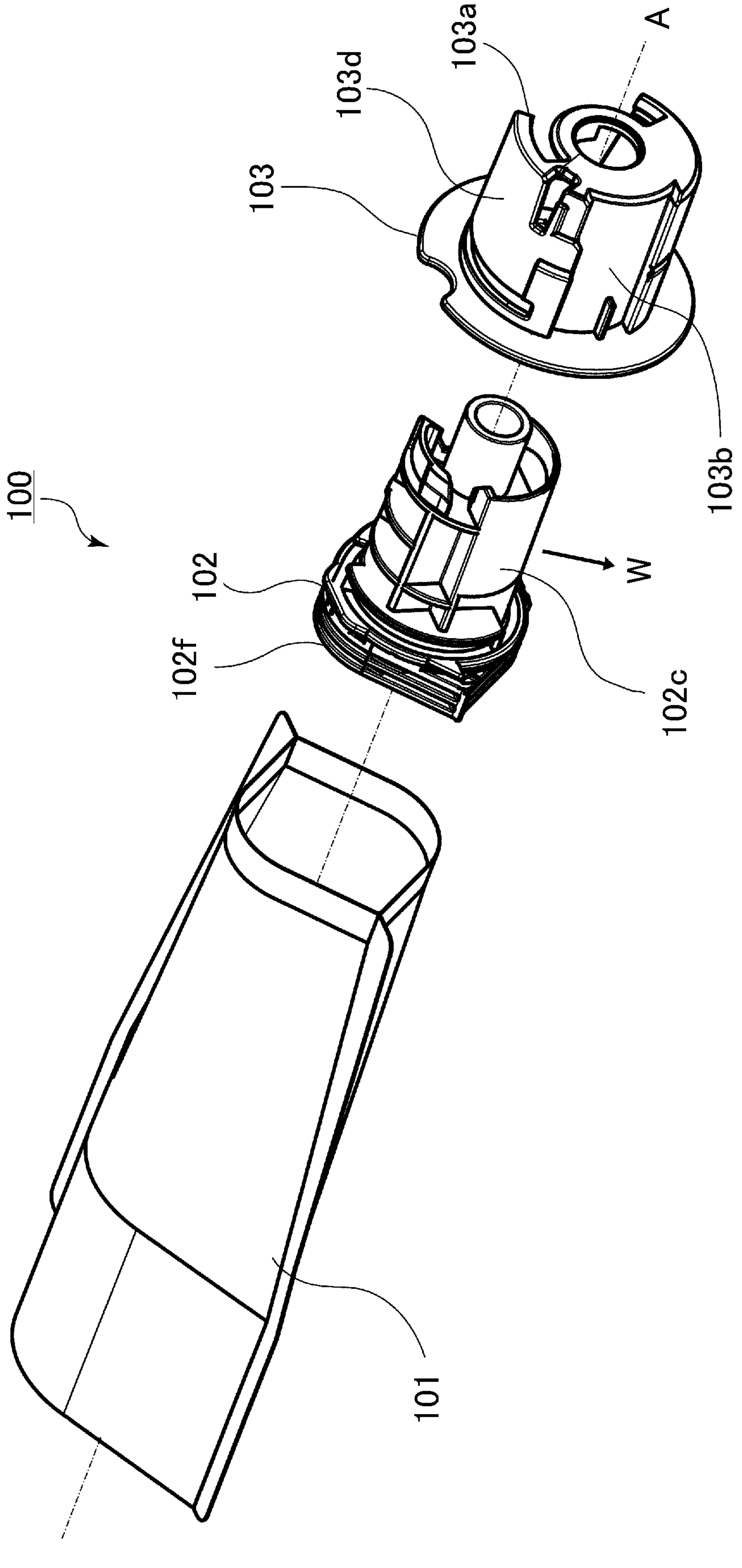
FIG. 8 is an exploded view of the toner pack according to the Embodiment 1.
Figure 9:
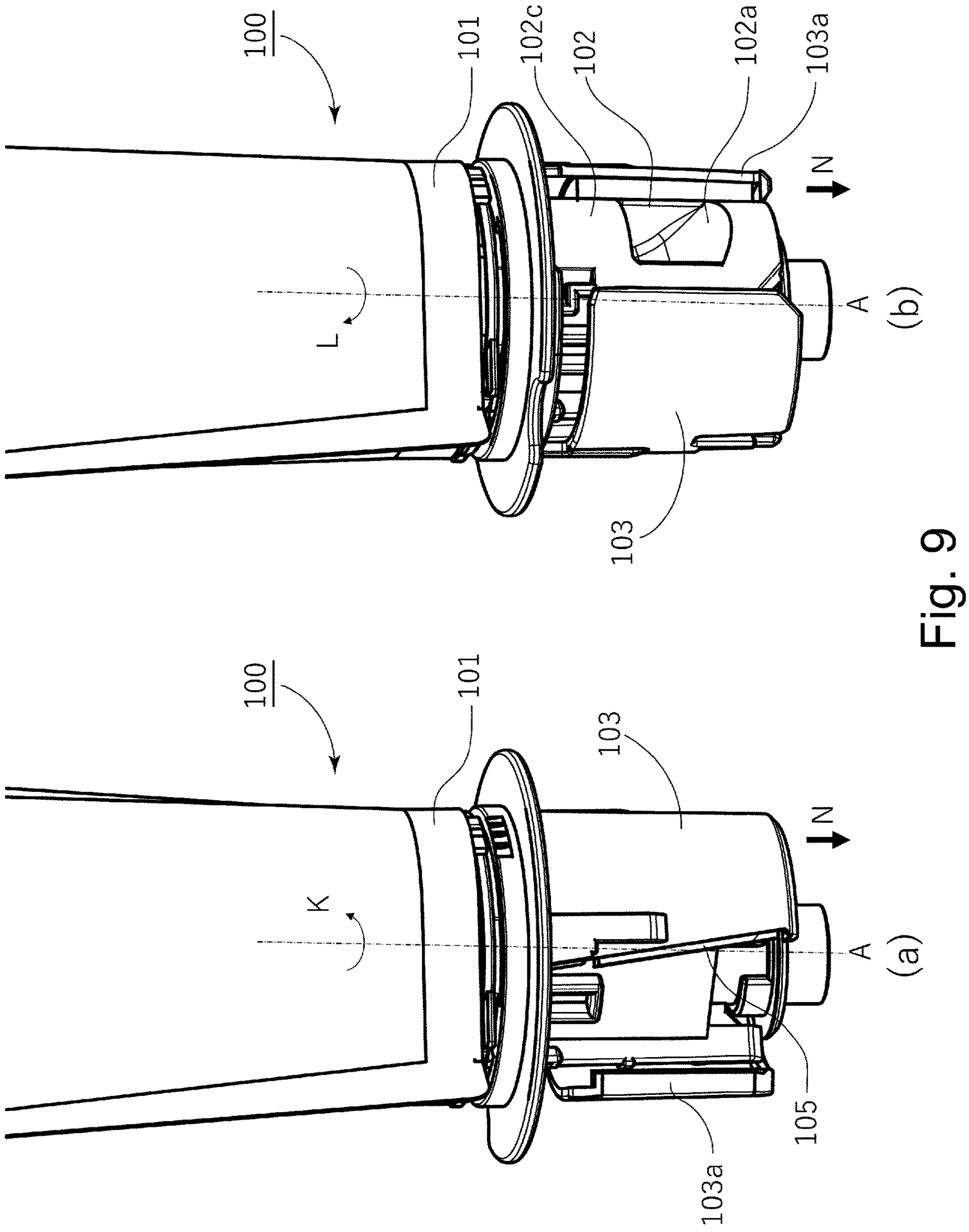
FIG. 9, part (a) and part (b), is a view for describing the toner pack according to the Embodiment 1.

Next, a configuration of the toner pack 100 will be described using FIG. 7, FIG. 8, and part (a) and part (b) of FIG. 9. FIG. 7 and FIG. 8 are exploded views of the toner pack 100. Part (a) of FIG. 9 is a perspective view of a nozzle 102 of the toner pack 100 in a state in which a pack-side shutter 103 is closed. Part (b) of FIG. 9 is a perspective view of the nozzle 102 in a state in which the pack-side shutter 103 is opened.

As shown in FIG. 7 and FIG. 8, the toner pack 100 is provided with a bag portion 101 (toner accommodating portion), which accommodates the toner, the nozzle 102 and the pack-side shutter 103. The pack-side shutter 103 is rotatable about an axis A with respect to the nozzle 102. With respect to an axial direction along with the axis A, the nozzle 102 is disposed at one end side of the axial direction of the bag portion 101.

In the present Embodiment, the bag portion 101 is a thing in which a flexible polypropylene sheet is formed into a bag shape by pouch processing, etc. An opening edge of the bag portion 101 is shielded by the opening edge being bonded to a bonding portion 102*f* of the nozzle 102 with a method such as welding.

The nozzle 102 includes a receiving opening 102*d* (FIG. 12) which is open toward an inner space of the bag portion 101, a discharging opening 102*a* which is open toward an outside of the toner pack 100, and a side surface (first outer surface) 102*c* which extends along the direction of the axis A. The discharging opening 102*a* of the present Embodiment is formed on the side surface 102*c*. Incidentally, in FIG. 7 and FIG. 8, an opening direction of the discharging opening 102*a* (a direction approximately perpendicular to the direction of the axis A) is indicated by an arrow W.

In addition, inside the nozzle 102, a flow passage 102*b* (FIG. 12), which connects the receiving opening 102*d* and the discharging opening 102*a*, is formed. The flow passage 102*b* preferably includes an inclined surface which is inclined so as to guide the toner flowing in from the receiving opening 102*d*, which is open upward, toward the discharging opening 102*a*, which is opened on the side surface 102*c* of the nozzle 102. The inclined surface is a surface inclined toward a side of the discharging opening 102*a* (left side in FIG. 12) with respect to a direction perpendicular to a gravity direction G as it goes along the gravity direction G (one side of a direction along the axis A) in a cross-sectional plane which passes through the discharging opening 102*a* and is parallel to the axis A.

The pack-side shutter 103 is supported by the nozzle 102 and is rotatable about the axis A. In the pack-side shutter 103, a pack-side seal 105 which slides against the side surface 102*c* of the nozzle 102 is attached. In addition, the pack-side shutter 103 includes a side surface (second outer surface) 103*d* which covers the side surface 102*c* of the nozzle 102 and an opening 103*a* which is formed by a part of the side surface 103*d* being cut out.

In addition, the pack-side shutter 103 includes a drive transmitted portion 103*b* which is formed by a part of the side surface 103*d* being recessed. The drive transmitted portion 103*b* is disposed so as to receive an operating force from the operating lever 108 of the toner receiving device 106.

The pack-side shutter 103 is movable between a closing position (part (a) of FIG. 9), where the pack-side seal 105 blocks the discharging opening 102*a* of the nozzle 102, and an opening position (part (b) of FIG. 9), where the discharging opening 102*a* of the nozzle 102 is exposed through the opening 103*a*. As shown in part (a) of FIG. 9, when the pack-side shutter 103 in the closing position is rotated in a direction of an arrow K about the axis A, the pack-side shutter 103 becomes in the opening position shown in part (b) of FIG. 9. Conversely, as shown in part (b) of FIG. 9, when the pack-side shutter 103 is rotated from the opening position in a direction of an arrow L, the pack-side shutter 103 becomes in the closing position.

In addition, as shown in FIG. 7, in the nozzle 102, a recessed portion 102*e*, which is formed by the side surface 102*c* being recessed, is disposed. The recessed portion 102*e* is a positioned portion which is configured so as to be positioned by engaging with the positioning portion 107*a* of the toner receiving device 106. When the pack-side shutter 103 is positioned in the closing position (part (a) of FIG. 9), the recessed portion 102*e* of the nozzle 102 is exposed through the opening 103*a*. When the pack-side shutter 103 is moved from the closing position to the opening position (part (b) of FIG. 9), the discharging opening 102*a* of the nozzle 102 is exposed through the opening 103*a* as described above.

(Mounting of the Toner Pack and a Lever Operation)

Figure 10:
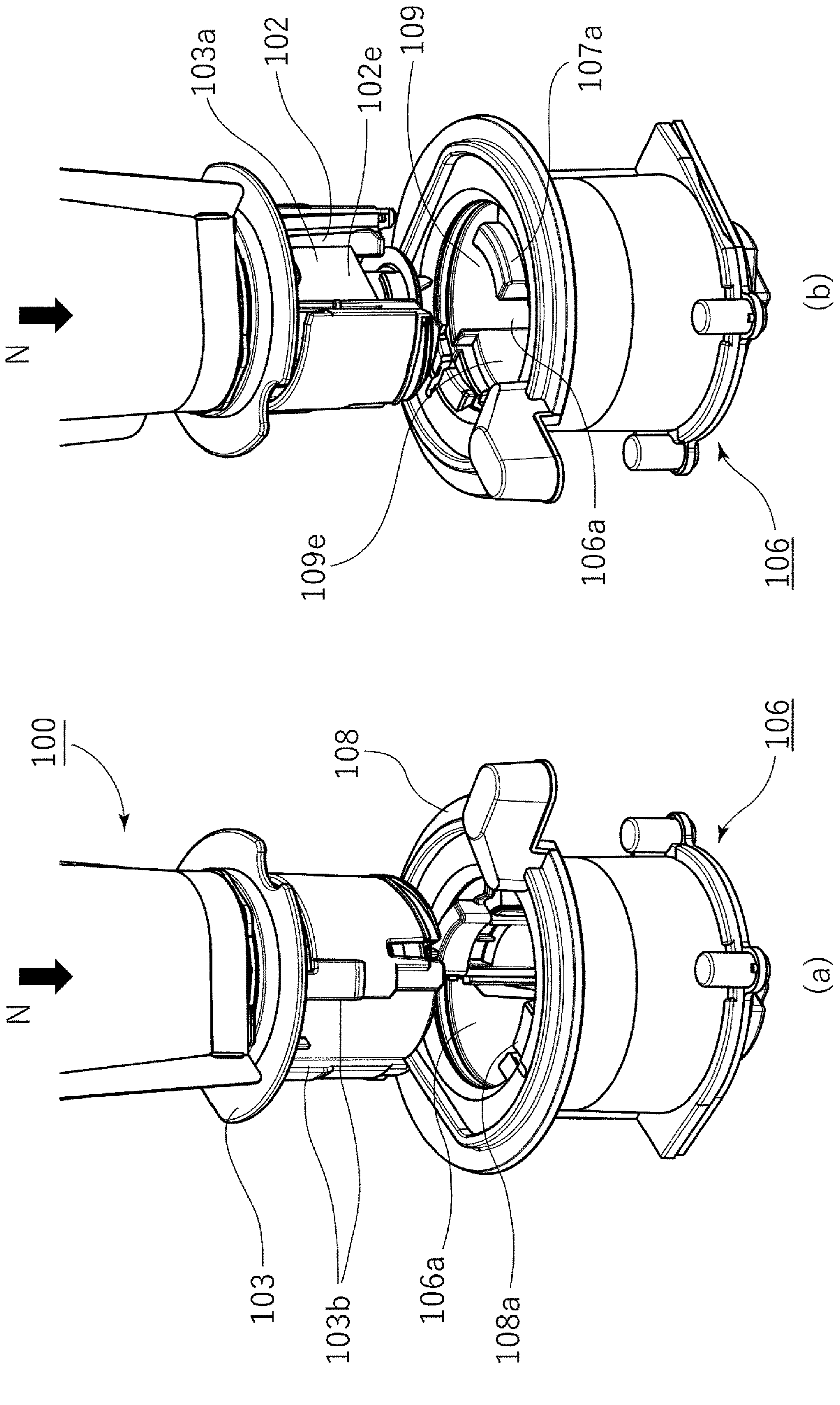
FIG. 10, part (a) and part (b), is a view for describing a mounting of the toner pack to the image forming apparatus according to the Embodiment 1.
Figure 11:
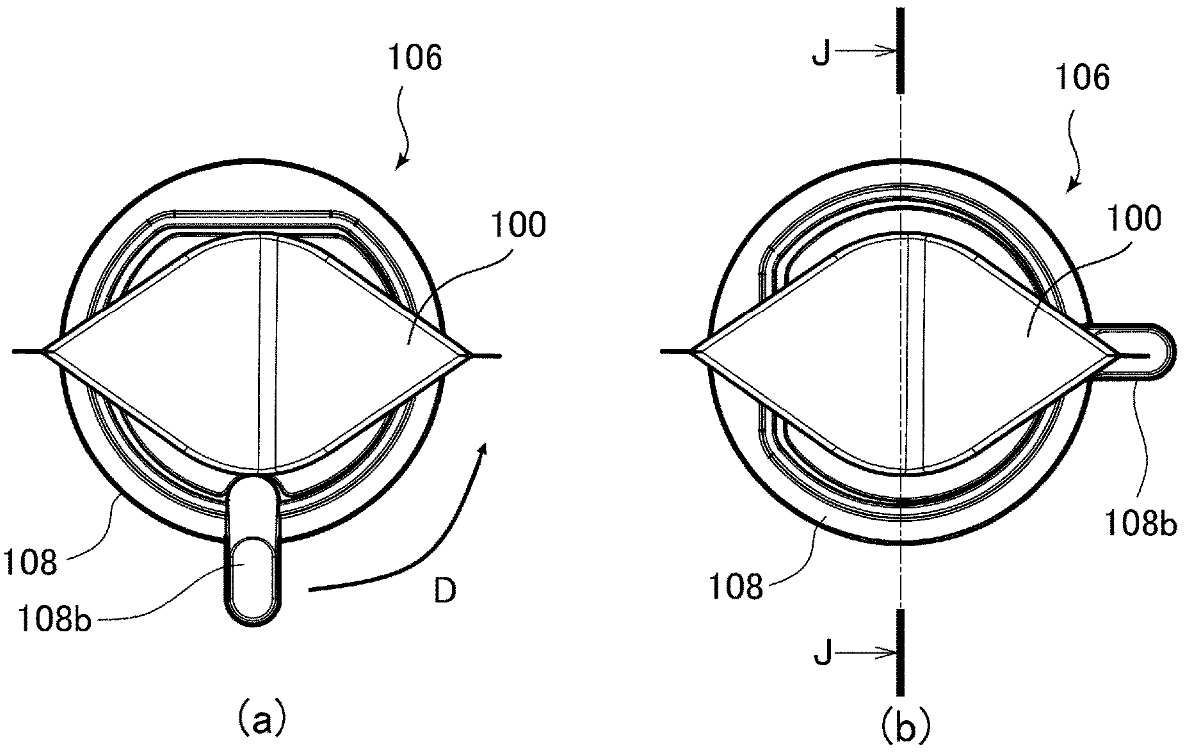
FIG. 11, part (a) and part (b), is a view for describing the mounting of the toner pack to the image forming apparatus according to the Embodiment 1.
Figure 12:
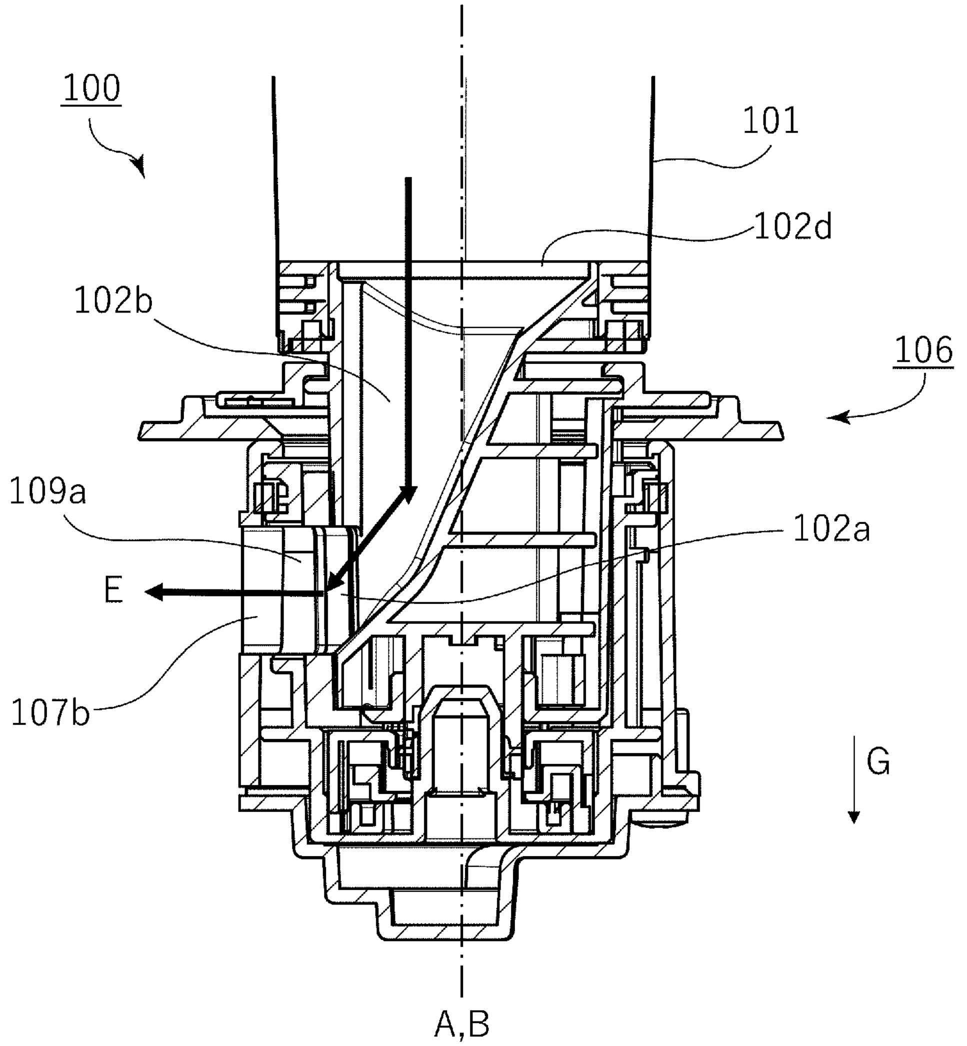
FIG. 12 is a cross-sectional view of the toner pack and the toner receiving device according to the Embodiment 1.

Next, insertion of the toner pack 100 to the toner receiving device 106 and an operation of the operating lever 108 will be described using part (a) and part (b) of FIG. 10, part (a) and part (b) of FIG. 11, and FIG. 12. Part (a) and part (b) of FIG. 10 are perspective views illustrating a state, where the toner pack 100 is mounted to the toner receiving device 106, viewed from different angles. Part (a) of FIG. 11 is a top view illustrating a state immediately after the toner pack 100 is mounted to the toner receiving device 106. Part (b) of FIG. 11 is a top view illustrating a state when the operating lever 108 is operated after the toner pack 100 is mounted to the toner receiving device 106. FIG. 12 is a cross-sectional view of the toner pack 100 and the toner receiving device 106 cut with a plane indicated by a J-J line in part (b) of FIG. 11.

As shown in part (a) and part (b) of FIG. 10, in a state before the toner pack 100 is mounted to the mounting space 106*a*, the device-side shutter 109 and the pack-side shutter 103 are both positioned in the closing position. The user grips the toner pack 100 and inserts the toner pack 100 to the mounting space 106*a* toward a direction of an arrow N with the nozzle 102 and the pack-side shutter 103 being downside.

Upon inserting, when viewed in the direction of the arrow N, positions of the opening 103*a* of the pack-side shutter 103 and the recessed portion 102*e* of the nozzle 102, and a position of the positioning portion 107*a* of the first frame member 107 should be aligned. At the same time, when viewed in the direction of the arrow N, a position of the drive transmitted portion 103*b* of the pack-side shutter 103 and a position of the drive transmitting portion 108*a* of the operating lever 108 should be aligned.

As a result, when the toner pack 100 is inserted to the mounting space 106*a*, the opening portion 103*a* and the recessed portion 102*e* are engaged with the positioning portion 107*a*, and the drive transmitted portion 103*b* is engaged with the drive transmitting portion 108*a*. In other words, while the nozzle 102 is positioned (stopped from rotating) by the positioning portion 107*a* of the first frame member 107, the pack-side shutter 103 becomes in a state integrally rotatable with the operating lever 108. In addition, a rotational axis (axis A) of the pack-side shutter 103 and a rotational axis (axis B) of the device-side shutter 109 are substantially aligned.

As shown in part (a) of FIG. 11, after inserting the toner pack 100 to the toner receiving device 106, the user grips the operating portion 108*b* of the operating lever 108 and rotates the operating lever 108 in a direction of an arrow D. The direction of the arrow D is a direction aligned with the direction of the arrow K in part (a) of FIG. 9. As the operating lever 108 rotates in the direction of the arrow D, the device-side shutter 109 moves from the closing position (part (a) of FIG. 5) to the opening position (part (b) of FIG. 5), and the pack-side shutter 103 also moves from the closing position (part (a) of FIG. 9) to the opening position (part (b) of FIG. 9). The discharging opening 102*a* exposed through the opening 103*a* of the pack-side shutter 103 faces the receiving opening 109*a* of the device-side shutter 109, which has moved to the opening position.

By this, as shown in FIG. 12, the inner space of the toner pack 100 and the inner space of the developing device 30 come to be communicated. That is, from the bag portion 101 of the toner pack 100, through the receiving opening 102*d* of the nozzle 102, the discharging opening 102*a* of the nozzle 102, the receiving opening 109*a* of the device-side shutter 109, and the discharging opening 107*b* of the first frame member 107, to the receiving opening 321 of the developer container 32 come to be communicated. By this, it becomes possible to replenish the toner from the toner pack 100 to the developing device 30.

After operating the operating lever 108, the user deforms the bag portion 101 by hand to reduce volume of the bag portion 101. As shown in part (b) of FIG. 1 and FIG. 12, the toner inside the bag portion 101 is pushed out with air in the bag portion 101 and flows in the toner accommodating chamber 36 of the developing device 30 through the flow passage E.

When discharge of the toner from the toner pack 100 is finished, the user returns the operating lever 108 from a position shown in part (b) of FIG. 11 to a position shown in part (a) of FIG. 11. By this, the device-side shutter 109 and the pack-side shutter 103 return to the closing positions, respectively, and it becomes possible to remove the toner pack 100 from the toner receiving device 106.

Incidentally, the toner pack 100 is only one example of a replenishing container and, for example, a replenishing container provided with a cylindrical toner accommodating portion with rigidity may be used instead of the soft bag portion 101 with flexibility. In this case, for example, it may be configured that the user discharges the toner by operating a piston which slides against the toner accommodating portion. In addition, a configuration of the toner receiving device 106 may be changed to match a specific configuration of the replenishing container. For example, instead of the configuration in which the pack-side shutter 103 and the device-side shutter 109 are opened and closed by the operation of the operating lever 108, each shutter may be opened and closed by the user rotating the replenishing container inserted to the toner receiving device 106 about the axis B.

(Configuration of the Flow Passage of the Toner)

Next, a configuration related to the flow passage of the toner, which is replenished from the toner pack 100 mounted to the image forming apparatus 1 (toner receiving device 106), in particular, the receiving opening 321 provided in the developer container 32 will be described.

Figure 13:
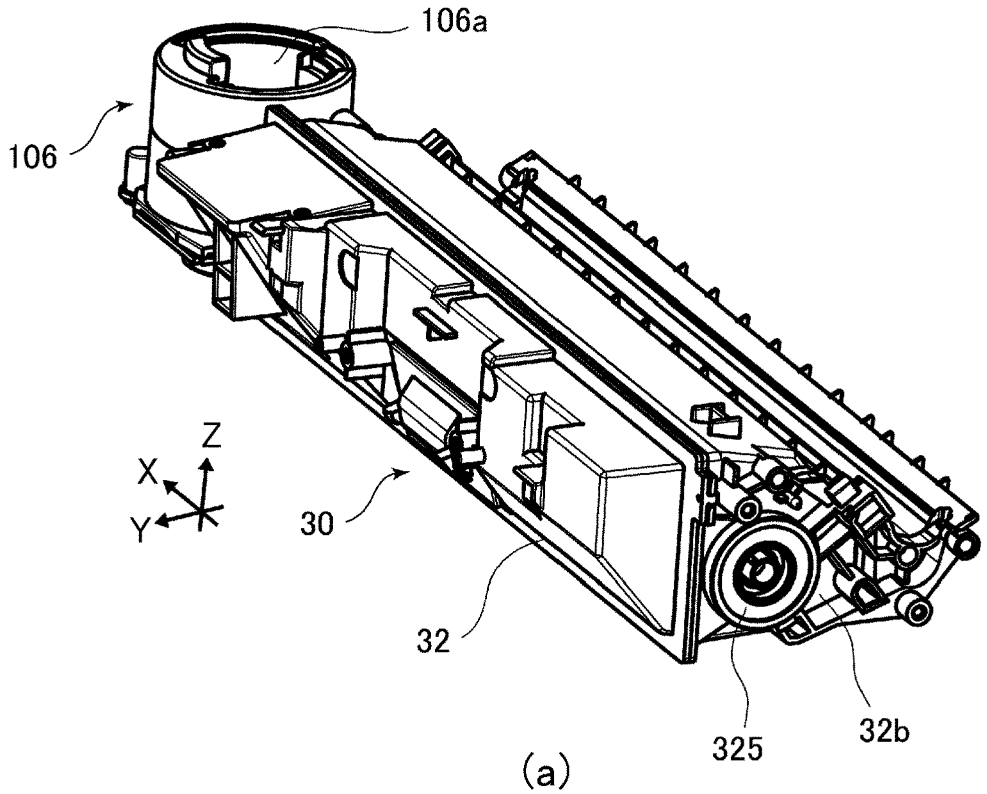
FIG. 13, part (a) and part (b), is a perspective view of the developing device and the toner receiving device according to the Embodiment 1.
Figure 13:
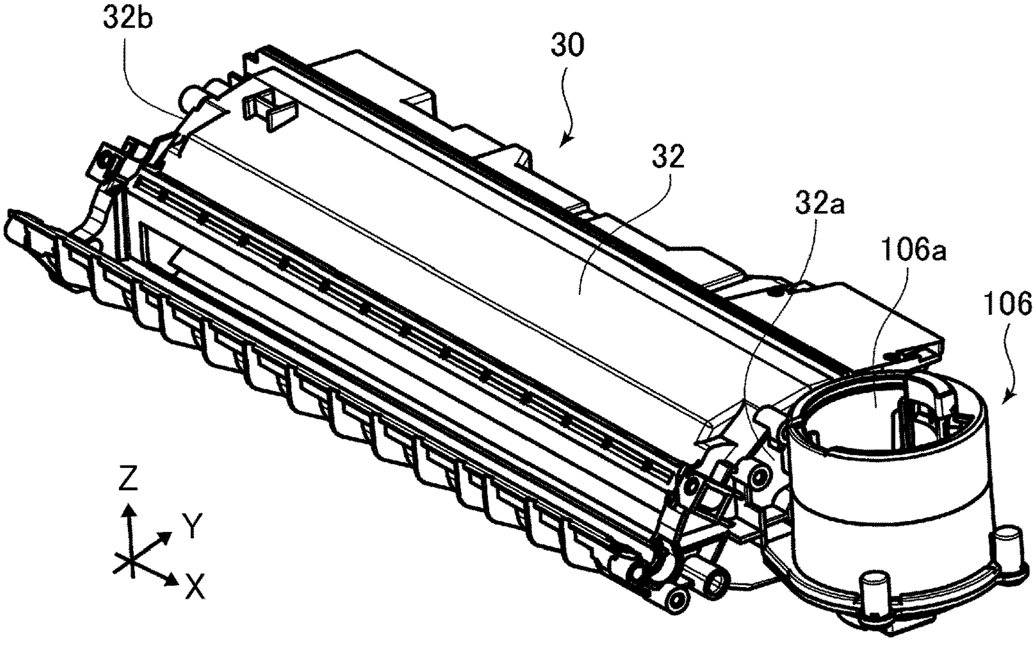
Figure 14:
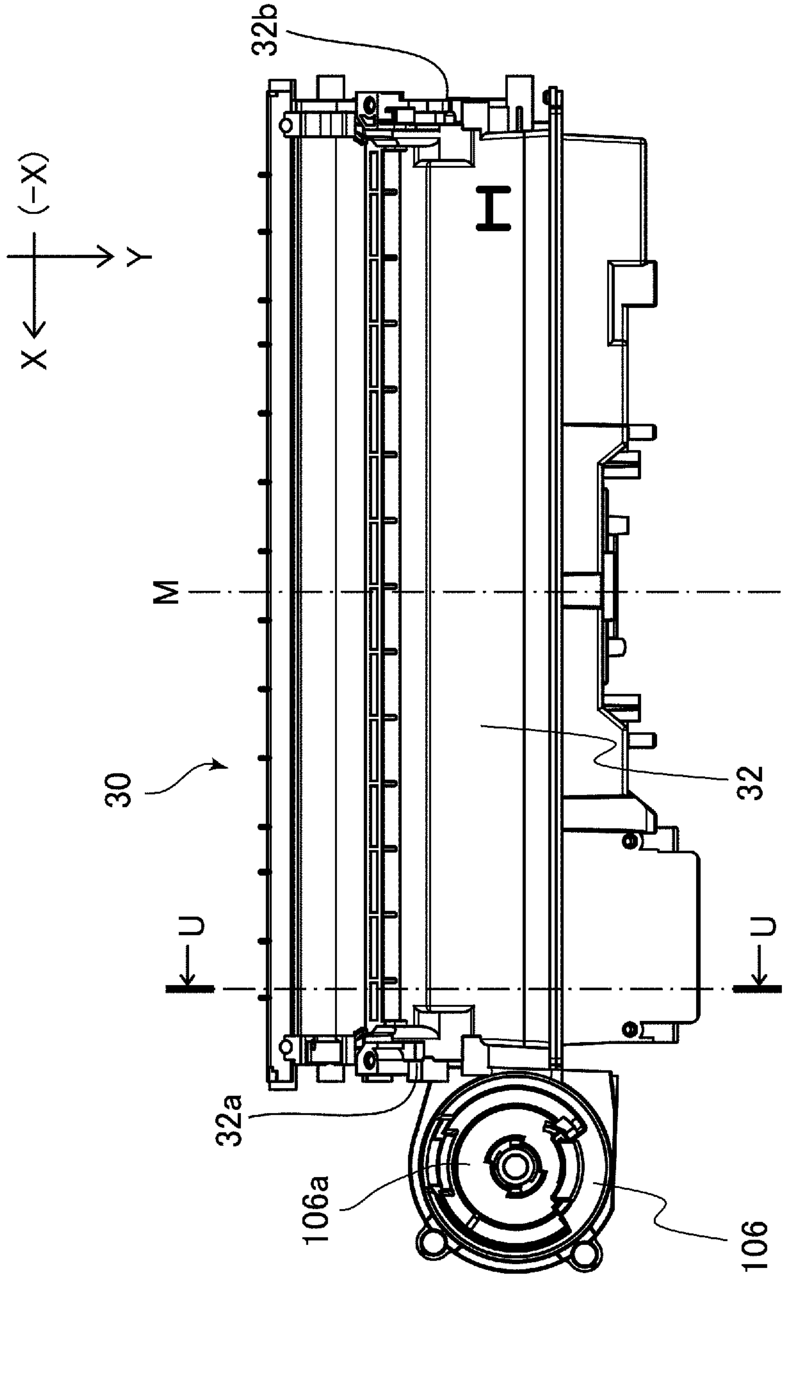
FIG. 14 is a top view of the developing device and the toner receiving device according to the Embodiment 1.
Figure 15:
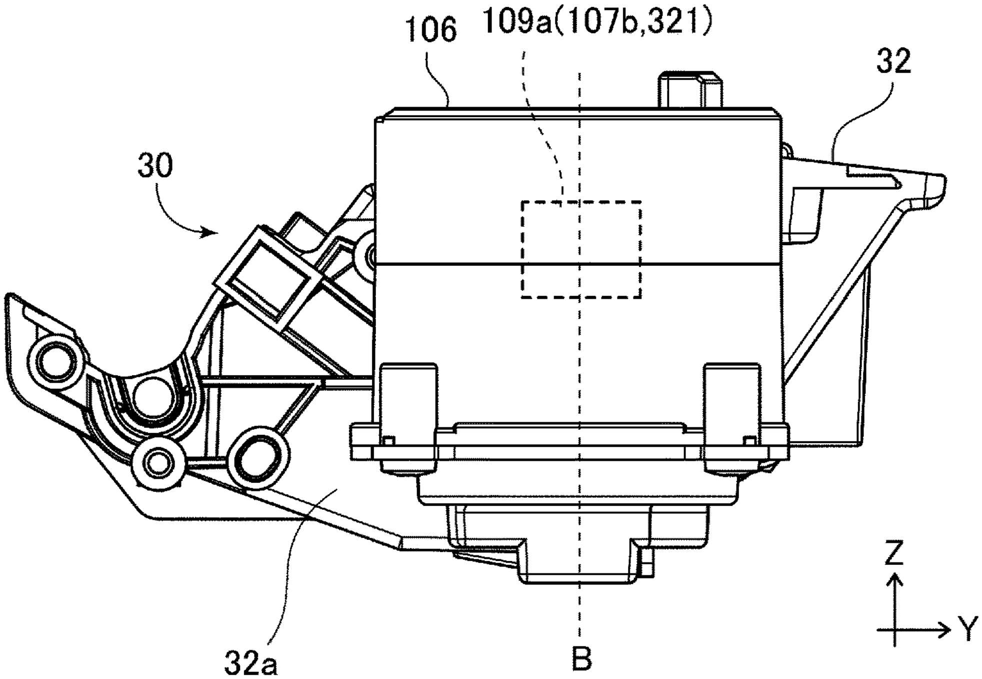
FIG. 15, part (a) and part (b), is a view for describing the developing device and the toner receiving device according to the Embodiment 1.
Figure 15:
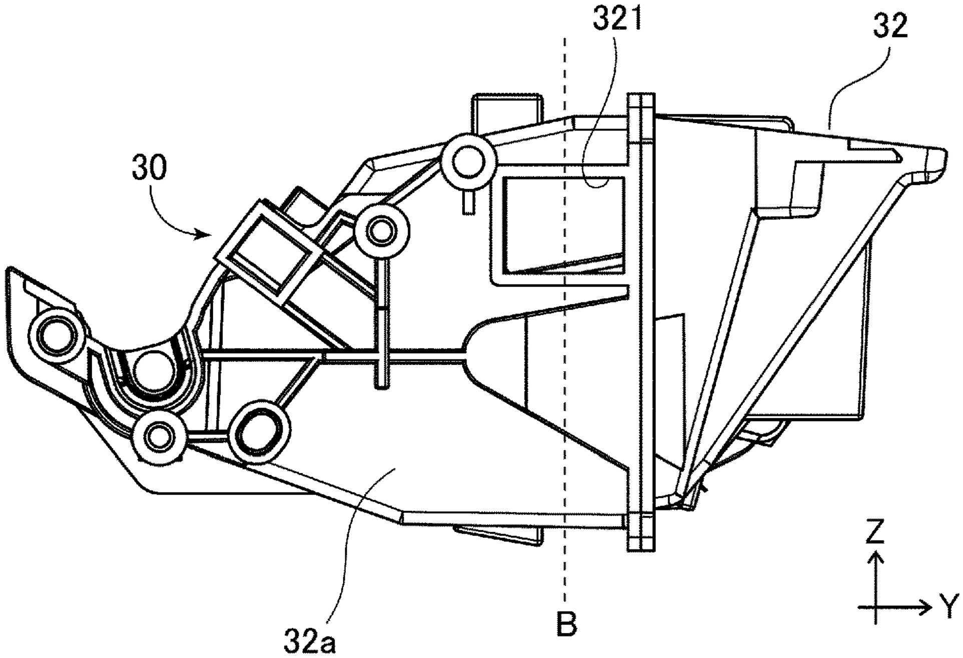
Figure 16:
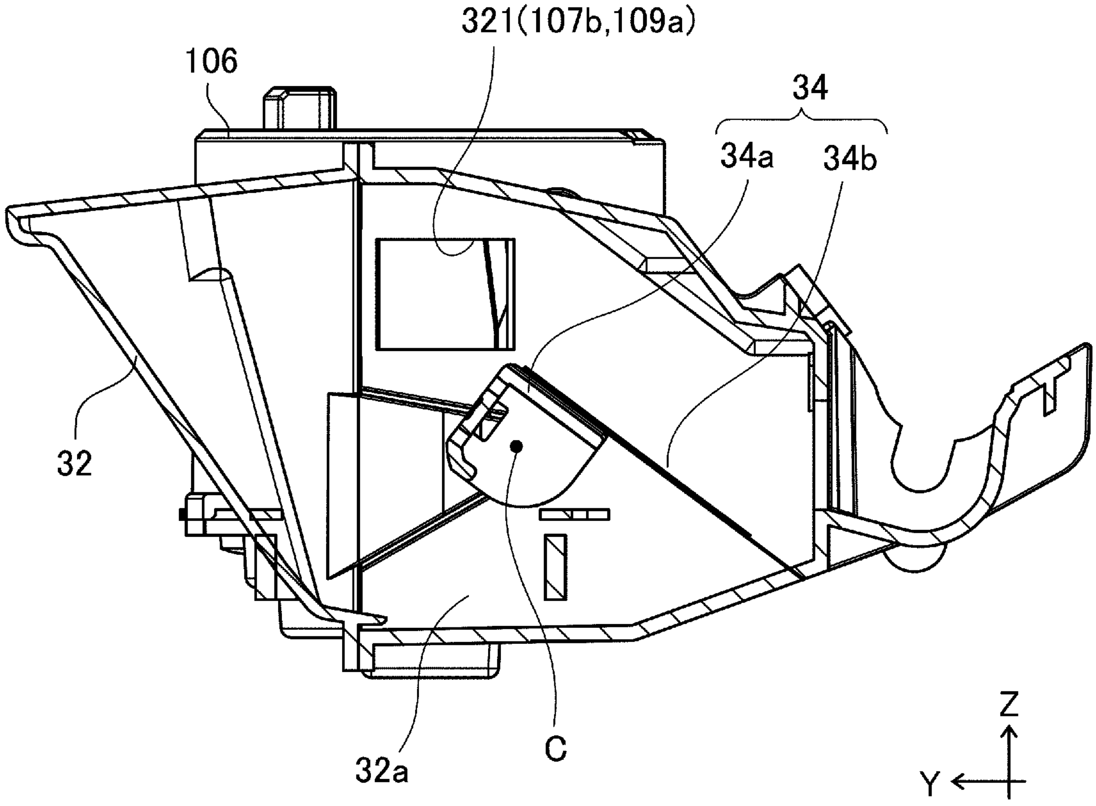
FIG. 16 is a view for describing the developing device and the toner receiving device according to the Embodiment 1.
Figure 17:
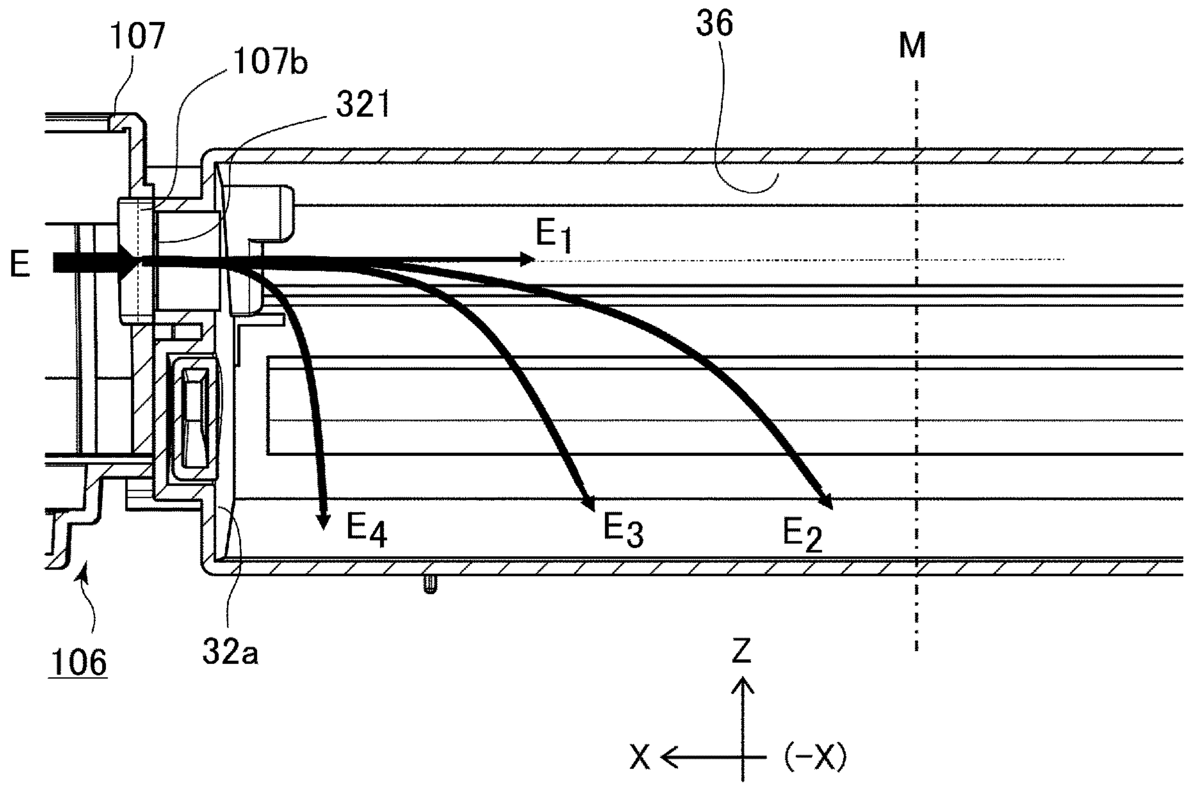
FIG. 17 is a view for describing a moving path of the toner according to the Embodiment 1.

Part (a) and part (b) of FIG. 13 are perspective views of the developing device 30 and the toner receiving device 106. FIG. 14 is a top view of the developing device 30 and toner receiving device 106 according to the present Embodiment. Part (a) of FIG. 15 is a side view of the developing device 30 and toner receiving device 106 viewed from a side of the toner receiving device 106 in the X direction (+X side). Part (b) of FIG. 15 is a side view of the developing device 30 viewed from the side of the toner receiving device 106 in the X direction (+X side). FIG. 16 is a cross-sectional view of the developing device 30 cut at a position indicated by a U-U line in FIG. 14. FIG. 16 shows a position of the receiving opening 321 etc., when viewed from inside the developer container 32 toward the side of the toner receiving device 106 in the X direction (+X side). FIG. 17 is an enlarged view which enlarges a part of the cross-sectional view of part (a) of FIG. 1. Incidentally, in each of the above Figures, the developing roller 31 and the operating lever 108 are omitted.

As shown in part (a) and part (b) of FIG. 13 and FIG. 14, the toner receiving device 106 of the present Embodiment is provided on one side of the X direction (+X side) with respect to the developer container 32. In other words, the receiving device of the present Embodiment is provided on a first end side (+X side) of a rotational axis of the developing roller with respect to the accommodating portion of the developing device. Therefore, the toner received from the toner pack 100 by the toner receiving device 106 reaches the developer container 32 by flowing toward the other side of the X direction (−X side, the second end side which is opposite to the first end side of the rotational axis of the developing roller).

The developer container 32 (accommodating portion) includes a first side surface 32*a*, which is a side surface of one side (a side of the toner receiving device 106) in the X direction, a second side surface 32*b*, which is a side surface of the other side in the X direction, and an upper surface portion and a lower surface portion connecting the first side surface 32*a* and the second side surface 32*b*. The toner accommodating chamber 36 is a space expanding between the first side surface 32*a* and the second side surface 32*b*. A longitudinal center M of the toner accommodating chamber 36 refers to a central position between an end position of the toner accommodating chamber 36 on the side of the first side surface 32*a* and an end position of the toner accommodating chamber 36 on the side of the second side surface 32*b* with respect to the X direction. The longitudinal center M of the toner accommodating chamber 36 may be rephrased as a central position of the developing roller 31 (central position of the outer circumferential surface of the developing roller 31 which carries the toner in the X direction). In addition, the first end side in the X direction refers to a side where the toner receiving device 106 is provided (downside in FIG. 14) with reference to the longitudinal center M of the toner accommodating chamber, and the second end side in the X direction refers to the opposite side (upside in FIG. 14).

An outer surface of the first side surface 32*a* faces the toner receiving device 106 in the X direction. On the second side surface 32*b*, which is an opposite side of the toner receiving device 106, for example, a drive mechanism such as a gear 325 (part (a) of FIG. 13) which transmits drive from a drive source in the printer main assembly 2 to the stirring member 34 may be provided. The drive mechanism such as the gear 325 may be provided, for example, so as to overlap with the toner receiving device 106 when viewed in the X direction. Incidentally, "overlapping two elements (units or components) when viewed in the X direction" means that a projected region of one element at least partially overlaps with a projected region of the other element when each element is vertically projected onto a virtual plane perpendicular to the X direction.

As shown in part (a) of FIG. 15, the toner receiving device 106 (mounting portion) of the present Embodiment is provided so as to overlap with the developer container 32 (accommodating portion) when viewed in the X direction. By this arrangement, a space for disposing the toner receiving device 106 and the developing device 30 when viewed in the X direction is reduced, thereby contributing to downsizing of the image forming apparatus 1.

As shown in part (b) of FIG. 15, FIG. 16 and FIG. 17, in the first end side of the developer container 32 in the X direction (+X side), the receiving opening 321 for receiving the toner from the toner receiving device 106 in the accommodating portion is disposed. The receiving opening 321 in the present Embodiment is formed on the first side surface 32*a*, which is the side surface of the first end side of the developer container 32 in the X direction. The receiving opening 321 is open to an outside of the developer container 32 toward the first end side in the X direction (+X side) and is open to the inner space of the developer container 32 toward the second end side in the X direction (−X side).

An opening area of the receiving opening 321 when viewed in the X direction (FIG. 16) is wider than an opening area of the receiving opening 321 when viewed in a direction perpendicular to the X direction (FIG. 17). The opening area of the receiving opening 321 when viewed in the direction perpendicular to the X direction may be zero. By this, it becomes possible to make the toner, which is replenished from the toner pack 100 and received in the developer container 32 by the receiving opening 321, land at a position closer to the longitudinal center M of the toner accommodating chamber 36. Details will be described below.

Incidentally, the receiving opening 321 in the present Embodiment is formed on the first side surface 32*a*, which extends approximately perpendicular to the X direction. Therefore, the opening area of the receiving opening 321 when viewed in the direction perpendicular to the X direction (FIG. 17) is substantially zero. However, even if the opening area of the receiving opening 321 when viewed in the direction perpendicular to the X direction is not zero, the opening area of the receiving opening 321 when viewed in the X direction should be larger.

A position of the receiving opening 321 and its relationship with the toner receiving device 106 will be further described. As shown in part (a) of FIG. 15, when viewed in the X direction, the position of the receiving opening 321 overlaps with the toner receiving device 106. In particular, the receiving opening 321 overlaps with the axis B of the device-side shutter 109 of the toner receiving device 106 described above.

As shown in FIG. 16, in a state in which the device-side shutter 109, which includes the receiving opening 109*a*, is positioned in the opening state, the receiving opening 109*a* of the device-side shutter 109 and the receiving opening 321 of the developer container 32 are aligned in the X direction. In addition, in the above state, when viewed in the X direction, an opening range of the receiving opening 109*a* of the device-side shutter 109 and an opening range of the receiving opening 321 of the developer container 32 are overlapped. In other words, a flow passage penetrating in the X direction is formed from the receiving opening 109*a*, which first receives the toner from the toner pack 100, to the space in the developer container 32. As shown in FIG. 17, the flow passage is formed by the receiving opening 109*a* (first receiving opening), the discharging opening 107*b*, and the receiving opening 321 (second receiving opening) being aligned in this order from the first end side to the second end side in the X direction.

As shown in part (b) of FIG. 15 and FIG. 17, the receiving opening 321 is formed as a short cylindrical shape (rectangular cylindrical shape) extending in the X direction from an opening position outside the developer container 32 to an opening position inside the developer container 32. The receiving opening 109*a* of the toner receiving device 106 and the discharging opening 107*b* are also openings of a shape (rectangular) corresponding to the receiving opening 321, respectively, when viewed in the X direction. Therefore, the above flow passage penetrating in the X direction is a linear space penetrating from the mounting space 106*a* of the toner receiving device 106 to the toner accommodating chamber 36 in the X direction. Incidentally, cross-sectional shapes of the receiving opening 321, the receiving opening 109*a* and the discharging opening 107*b* are not limited to rectangular, but may be circular, oval or rectangular with rounded corners, for example.

In addition, as shown in FIG. 16, when viewed in the X direction, the receiving opening 321 may be provided so that the receiving opening 321 of the developer container 32 is positioned above the shaft portion 34*a* of the stirring member 34. Specifically, when viewed in the X direction, the receiving opening 321 may be provided so that a lower end of the receiving opening 321 is positioned above a rotational axis C of the shaft portion 34*a*, and the opening range of the receiving opening 321 in a horizontal direction (Y direction) overlaps with a width of the shaft portion 34*a* with respect to the horizontal direction (Y direction).

(Moving Path of the Replenished Toner)

An action of the configuration of the flow passage of toner described above will be described. Arrows E in part (b) of FIG. 1 and FIG. 17 represent representative moving paths of the toner flowing from the toner pack 100 inside the developer container 32.

As described above, when the toner pack 100 is inserted to the toner receiving device 106 and the operating lever 108 is operated, it becomes a state where the toner may be replenished to the developer container 32 through the receiving opening 109*a* of the device-side shutter 109 and the receiving opening 321 of the developer container 32. In the above state, by the user deforming and reducing the volume of the bag portion 101 of the toner pack 100, the toner in the bag portion 101 is discharged from the discharging opening 102*a* of the nozzle 102 (an arrow E of part (b) of FIG. 1).

The discharged toner flows along the flow passage from the nozzle 102 to the receiving opening 321 of the developer container 32 by pressure generated when the user reduces the volume of the bag portion 101, and the higher the pressure in the bag portion 101 is, the more vigorous the flow becomes. Specifically, the toner flows from the bag portion 101 in the inside of the developer container 32 along the flow passage constituted by the flow passage 102*b* and the discharging opening 102*a* in the nozzle 102, the receiving opening 109*a* and the discharging opening 107*b* of the toner receiving device 106, and the receiving opening 321 of the developer container 32.

As described above, the receiving opening 321 of the developer container 32 is configured so that the opening area of the receiving opening 321 when viewed in the X direction (FIG. 16) is wider than the opening area of the receiving opening 321 when viewed in the direction perpendicular to the X direction (FIG. 17). By this configuration, it becomes possible to make a movement direction of the toner, which flows in the developer container 32 through the receiving opening 321 provided at the first end side of the developer container 32 in the X direction, have a velocity component toward the longitudinal center M of the toner accommodating chamber 36 with respect to the X direction. In other words, it becomes possible to make a velocity component of the toner which flows in the developer container 32 through the receiving opening 321 toward the second end side in the X direction (−X side) be larger than a velocity component toward a direction perpendicular to the X direction.

As shown in FIG. 17, when the toner passes through the receiving opening 321 provided on the first end side of the developer container 32 in the X direction, the toner is moving in a direction E1 toward the longitudinal center M of the toner accommodating chamber 36 with respect to the X direction. Thereafter, due to deceleration by gravity and air resistance, the toner disperses in the X direction, falls and accumulates in the developer container 32, as shown by an arrow E2, an arrow E3 and an arrow E4. In other words, by configuring the receiving opening 321 of the developer container 32 to open toward the longitudinal center M of the toner accommodating chamber 36 with respect to the X direction, it becomes possible to make a landing position of the toner, which flows in the developer container 32 through the receiving opening 321, be closer to the longitudinal center M of the toner accommodating chamber 36.

(Operation After the Toner Replenishment)

Figure 18:
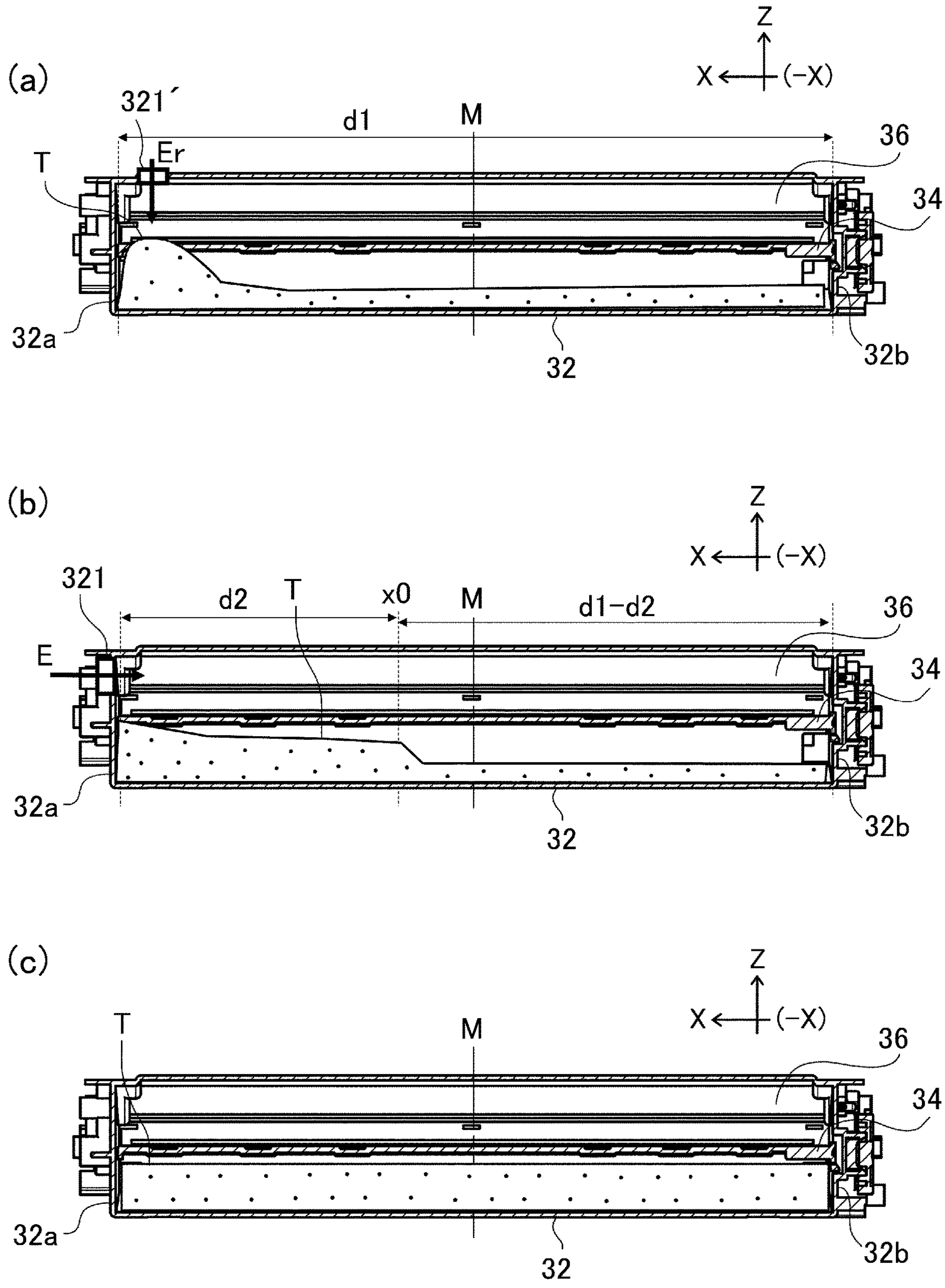
FIG. 18, part (a), part (b) and part (c), is a view for describing a leveling of a toner surface in a Comparative Example and the Embodiment 1.

A process by which the toner replenished in the developer container 32 is spread over an entire longitudinal direction of the toner accommodating chamber 36 by the stirring member 34 will be described using part (a), part (b) and part (c) of FIG. 18. Part (a) of FIG. 18 is a schematic view illustrating a distribution of the toner in the toner accommodating chamber 36 immediately after a toner replenishment in a Comparative Example. Part (b) of FIG. 18 is a schematic view illustrating a distribution of the toner in the toner accommodating chamber 36 immediately after a toner replenishment in the present Embodiment. Part (c) of FIG. 18 is a schematic view illustrating a state after the distribution of the toner in the toner accommodating chamber 36 is leveled.

In the Comparative Example of part (a) of FIG. 18, the receiving opening 321' of the developer container 32 is provided in a top surface of the developer container 32, and it is configured that a direction Er in which the toner flows in the toner accommodating chamber 36 becomes approximately perpendicular to the X direction. Therefore, in the Comparative Example, the toner immediately after a replenishment is deposited near the receiving opening 321', and a toner surface T near the receiving opening 321' becomes very high.

Thereafter, a peak of the toner surface T near the receiving opening 321' is gradually flattened since the toner is dispersed in the X direction due to a stirring action of the stirring member 34. Incidentally, the stirring member 34 in the present Embodiment stirs the toner by the stirring portion 34*b* (FIG. 16) of a sheet-like member which extends long in the X direction, and does not actively move the toner in the X direction. However, when a concentrated portion of the toner is pressed by the stirring portion 34*b*, the pressed toner spreads to a side where the toner is less with respect to the X direction, and the toner is gradually dispersed in the X direction with rotation of the stirring member 34.

Such phenomenon is referred to as a "toner conveyance" in the present Embodiment, which includes a case in which the toner appears to be moving superficially from a higher portion to a lower portion of the toner surface T.

Here, in the Comparative Example, a distance in the X direction from the first end portion to the second end portion of the toner accommodating chamber 36 in the X direction is defined as d1. In the Comparative Example, the toner immediately after a replenishment is deposited near the receiving opening 321', which is positioned at the first end portion of the toner accommodating chamber 36 in the X direction. Therefore, to spread the toner to the second end side of the toner accommodating chamber 36 in the X direction, the toner is conveyed almost the distance d1.

In contrast, in the configuration of the present Embodiment shown in part (b) of FIG. 18, the direction E in which the toner flows in the toner accommodating chamber 36 is a direction toward the longitudinal center M of toner accommodating chamber 36 with respect to the X direction, therefore the toner is deposited at a position away from the receiving opening 321 to the second end side in the X direction (−X side). Although positions of the toner deposition are dispersed in the X direction, at least a part of the toner is positioned at a position x0 which is closer to the longitudinal center M than the receiving opening 321' in the Comparative Example.

When a distance in the X direction from the end portion of the first end side of the toner accommodating chamber 36 in the X direction to the above position x0 is defined as d2, then in the present Embodiment, in order to spread the toner to the second end side of the toner accommodating chamber 36 in the X direction, the toner in the position x0 should be conveyed only a distance of (d1-d2). The distance (d1-d2) is shorter than the distance d1 of the Comparative Example. In other words, in the present Embodiment, because the toner flies the distance d2 (distance from the first side surface 32*a* to the position x0), from the receiving opening 321 toward the longitudinal center M of the toner accommodating chamber 36 before landing, a distance the stirring member 34 conveys the toner with respect to the X direction becomes shorter.

Therefore, in the present Embodiment, time until a height of the toner surface T becomes sufficiently leveled, as shown in part (c) of FIG. 18, becomes shorter than in the Comparative Example. In other words, it becomes possible to quickly spread the toner, which is replenished in the developer container 32 from the external device of the image forming apparatus 1, throughout the developer container 32.

In addition, in the present Embodiment, it is configured that by the stirring action of the stirring portion 34*b*, which is made of the sheet-like member as described above, the toner surface T in the toner accommodating chamber 36 is gradually leveled. Therefore, the action of the stirring member 34 to move the toner in the toner accommodating chamber 36 with respect to the X direction is milder than, for example, in a case in which an agitating member which actively moves the toner with respect to the X direction by means of a screw shape is used. Therefore, in the configuration of the present Embodiment in which the stirring portion 34*b* constituted by the sheet-like member is used, it is particularly useful to quicken the leveling of the toner surface T by making the toner, which flows through the receiving opening 321, land near the longitudinal central portion M of the toner accommodating chamber 36.

Thus, in the present Embodiment, the toner receiving opening 321 for receiving the toner in the toner accommodating chamber 36 is provided with the first end side of the developer container 32 with respect to the X direction (+X side). In addition, the opening area of the receiving opening 321 when viewed in the X direction is wider than the opening area of the receiving opening 321 when viewed in the direction perpendicular to the X direction.

In other words, the accommodating portion of the developing device of the present Embodiment includes the receiving opening provided on the first end side of the accommodating portion with respect to the rotational axis direction of the developing roller. In addition, the opening area of the receiving opening when viewed in the rotational axial direction is wider than the opening area of the receiving opening when viewed in the direction perpendicular to the rotational axial direction. By this configuration, it becomes possible to provide a developing device and an image forming apparatus provided with the developing device capable of promptly spreading the replenished toner.

Incidentally, specific advantages of quickly spreading the replenished toner throughout the toner accommodating chamber 36 include, for example, the following (1) through (3).

(1) The image forming apparatus 1 is provided with the remaining amount detecting sensor which detects the remaining amount of the toner in the developer container 32, and based on a detected result of the remaining amount detecting sensor, the image forming apparatus 1 performs a suspension or a resuming of the image forming operation or notification to the user via the operating portion. For example, in a case in which the remaining amount of the toner in the developer container 32 becomes below a predetermined threshold value, it may be configured that the image forming operation is disabled to be started, and in a case in which the remaining amount of the toner in the developer container 32 becomes equal to or more than a predetermined threshold value by the toner replenishment, the image forming operation is enabled to be started. In this case, if the replenished toner is spread quickly throughout the toner accommodating chamber 36, it is possible to reduce a downtime until the image forming operation is enabled to be started.

(2) In addition, in a case in which the remaining amount of the toner in the developer container 32 is below a predetermined threshold value, it may be configured to display a message which requests the toner replenishment on the operating portion, and stop displaying the above message when the remaining amount of the toner becomes equal to or more than a predetermined threshold value. In this case, it is possible to improve usability since the refilled toner is spread quickly in the toner accommodating chamber 36, which quicken a timing at which the remaining amount detecting sensor detects an increase of the remaining amount of the toner, and the user can confirm more quickly that the toner replenishment is normally performed.

(3) Furthermore, it is possible to configure that the image forming operation is started after the stirring member 34 is rotated for a predetermined period of time from the toner pack 100 being dismounted from the toner receiving device 106. In this case, if the replenished toner is spread quickly in the toner accommodating chamber 36, it becomes possible to reduce a possibility for an image defect (uneven density), caused by the toner surface T not being sufficiently leveled in the toner accommodating chamber 36, to occur in the image forming operation immediately after the toner replenishment.

In addition, in the present Embodiment, as described above, the receiving opening 321 of the developer container 32 is provided above the shaft portion 34*a* of the stirring member 34. By this, it becomes possible to increase a moving distance from the toner flowing in the toner accommodating chamber 36 from the receiving opening 321 to the toner landing on the toner surface in the toner accommodating chamber 36 with respect to the X direction, and to make the toner to land closer to the longitudinal center M. In addition, since the toner lands near the shaft portion 34*a*, it becomes possible for the toner immediately after the replenishment to be more securely subjected to the stirring action of the stirring member 34.

By the way, in view of a configuration of the image forming apparatus, the toner receiving device 106 includes a receiving opening 109*a* (first receiving opening) for receiving the toner from the toner pack 100, and the developer container 32 includes the receiving opening 321 (second receiving opening) for receiving the toner into the developer container 32. And in a state in which the toner can be replenished to the developer container 32 through the receiving opening 109*a* and the receiving opening 321 (in a state in which the device-side shutter 109 is positioned at the opening position), the receiving opening 109*a* and the receiving opening 321 are arranged as below. That is, the receiving opening 109*a* of the toner receiving device 106 is positioned on the second end side (−X side) in the X direction with respect to the mounting space 106*a* in which the toner pack 100 is accommodated in the toner receiving device 106 (part (b) of FIG. 1). The opening area of the receiving opening 109*a* when viewed in the X direction (approximately the same as the receiving opening 321 of FIG. 16) is wider than the opening area of the receiving opening 109*a* when viewed in the direction perpendicular to the X direction (part (b) of FIG. 1). And the receiving opening 321 of the developer container 32 is positioned closer to the longitudinal center M of the developer container 32 in the X direction than the receiving opening 109*a* of the toner receiving device 106.

In other words, the mounting portion includes the first receiving opening configured to receive the toner discharged from the replenishing container, and the accommodating portion includes a second receiving opening for receiving the toner flowing from the first receiving opening in the accommodating portion. In a state in which the toner is capable of being replenished to the accommodating portion through the first receiving opening and the second receiving opening, the first receiving opening is positioned on the second end side opposite to the first end side in the rotational axis direction of the developing roller with respect to the mounting space in which the replenishing container is mounted in the mounting portion. In addition, in the above state, the opening area of the first receiving opening when viewed in the rotational axial direction is wider than the opening area of the first receiving opening when viewed in a direction perpendicular to the rotational axial direction. Furthermore, in the above state, the second receiving opening is positioned on the second end side in the rotational axis direction than the first receiving opening and on the first end side in the rotational axis direction than the central position of the accommodating portion in the rotational axis direction.

Incidentally, "the first receiving opening is positioned on the second end side opposite to the first end side in the rotational axis direction of the developing roller with respect to the mounting space in which the replenishing container is mounted in the mounting portion" means that the first receiving opening is provided on a side of the accommodating portion of the developing device. In other words, in part (a) of FIG. 1, it is configured when the device-side shutter 109 is in the opening position, the receiving opening 109*a* as the first receiving opening is positioned on the −X side, which is the same side as the developer container 32 with respect to the mounting space 106*a* in which the toner pack 100 is mounted.

According to the above configuration, the movement direction of the toner when the toner receiving opening 109*a* of the toner receiving device 106 receives the toner from the toner pack 100 becomes a direction facing toward a side of the longitudinal center M of the toner accommodating chamber 36 (the second end side in the rotational axis direction) with respect to the X direction. And since the toner flows in the toner accommodating chamber 36 through the receiving opening 321 which is positioned on the second end side in the X direction than the receiving opening 109*a*, it becomes possible to make the toner fall onto a position closer to the longitudinal center M in the toner accommodating chamber 36.

Thus, according to present Embodiment, due to an action resulted from the receiving opening 109*a* (first receiving opening) of the toner receiving device 106 (mounting portion) and the receiving opening 321 (second receiving opening) of the developer container 32, it becomes possible to spread the replenished toner quickly in the toner accommodating chamber 36.

In addition, in the present Embodiment, as described above, it is configured that in a state in which the device-side shutter 109 is positioned in the opening state, the opening range of the receiving opening 109*a* of the device-side shutter 109 and the opening range of the receiving opening 321 of the developer container 32 are overlapped when viewed in the X direction. In other words, it is configured that the flow passage which penetrates in the X direction from the receiving opening 109*a*, where the image forming apparatus 1 first receives the toner from the toner pack 100, to the space in the developer container 32 is formed. According to the configuration, it becomes possible to let the toner, which is replenished from the toner pack 100, flow more vigorously toward the longitudinal center M of the toner accommodating chamber 36 than in a configuration in which the flow passage is bent.

Modification Example

Figure 25:
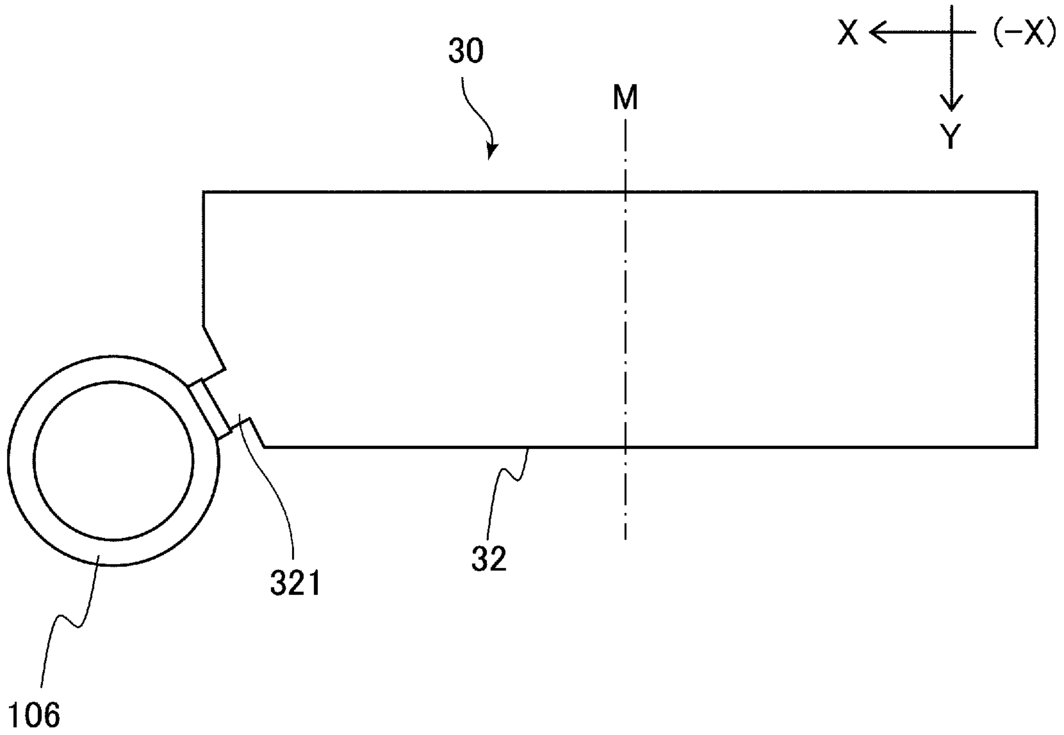
FIG. 25 is a schematic view of a developing device and a toner receiving device according to a Modified Example.

In the Embodiment 1, the configuration in which the receiving opening 321 of the developer container 32 opens substantially in the X direction is exemplified, however, as shown in FIG. 25, for example, a receiving opening 321 may be configured to open in a direction inclined with respect to the X direction. In this case as well, when viewed in the X direction, an opening area of the receiving opening 321 should be larger than an opening area of the receiving opening 321 when viewed in a direction perpendicular to the X direction. By this, it is possible to obtain the same advantages as in Embodiment 1 by making the toner which flows into the developer container 32 through the receiving opening 321 have a velocity component of the second end side in the X direction (−X side).

Embodiment 2

A developing device and an image forming apparatus according to an Embodiment 2 will be described. Hereinafter, elements with common reference numerals with the Embodiment 1 shall have substantially the same configurations and actions as those described in the Embodiment 1, unless otherwise specified, and different points from the Embodiment 1 will be described mainly.

Figure 19:
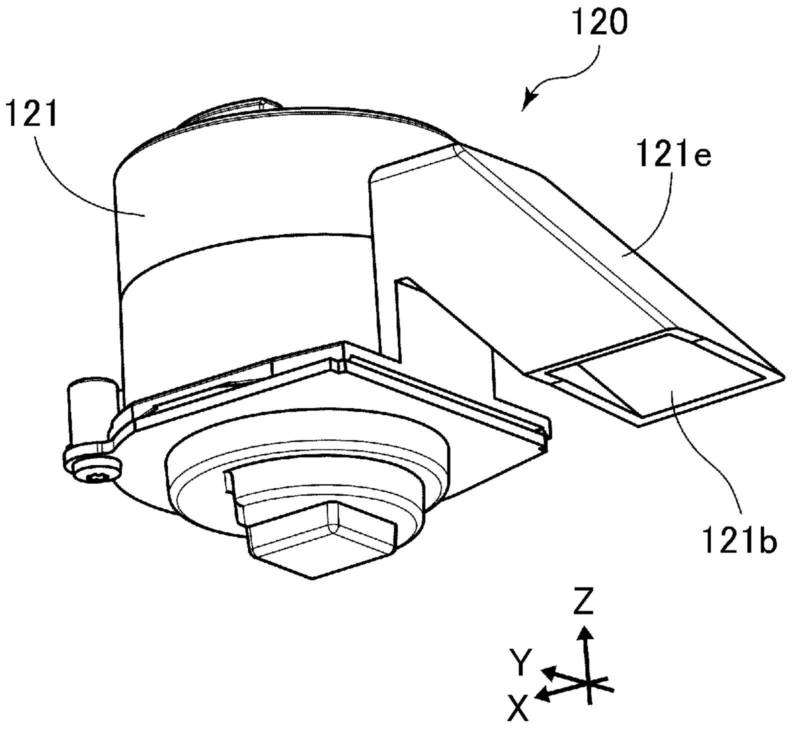
FIG. 19 is a perspective view of a toner receiving device according to an Embodiment 2.
Figure 20:
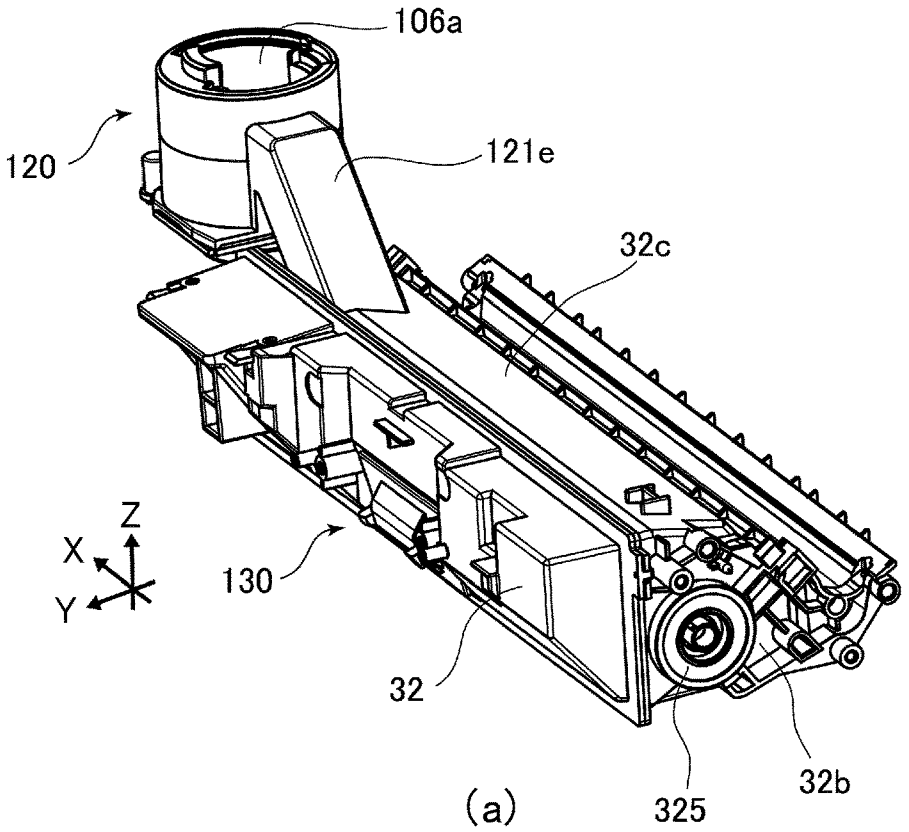
FIG. 20, part (a) and part (b), is a perspective view of the developing device and the toner receiving device according to the Embodiment 2.
Figure 20:
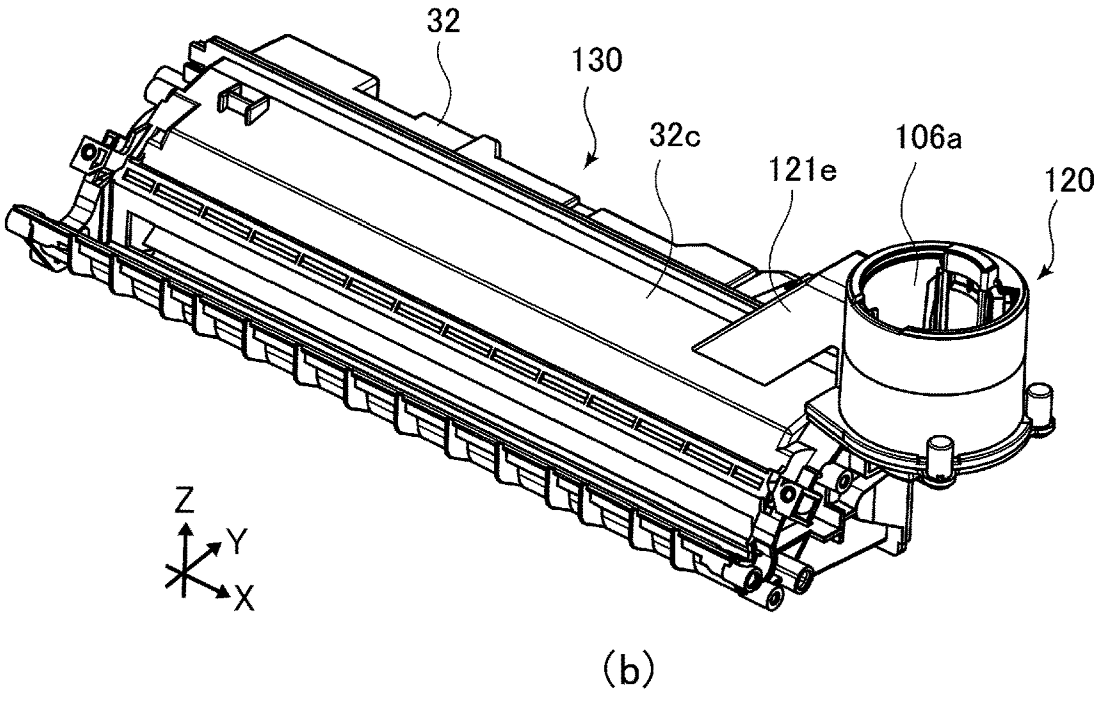
Figure 21:
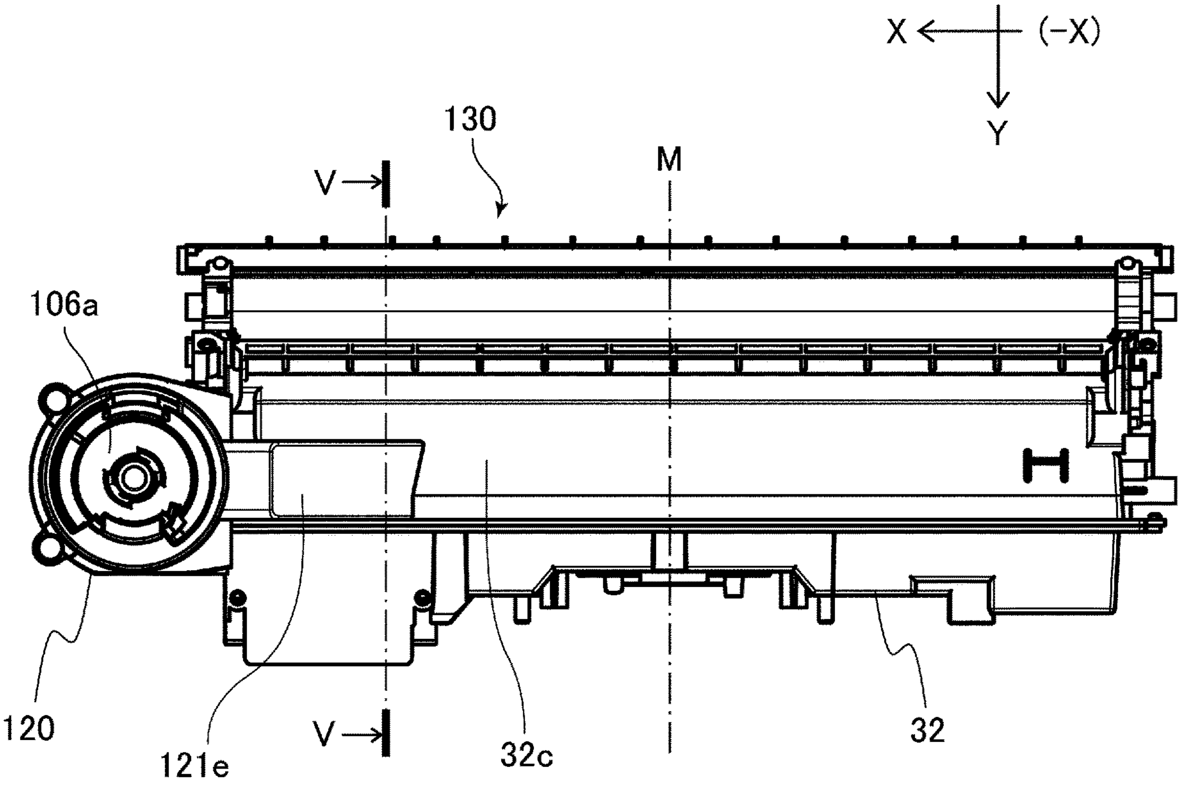
FIG. 21 is a top view of the developing device and the toner receiving device according to the Embodiment 2.
Figure 22:
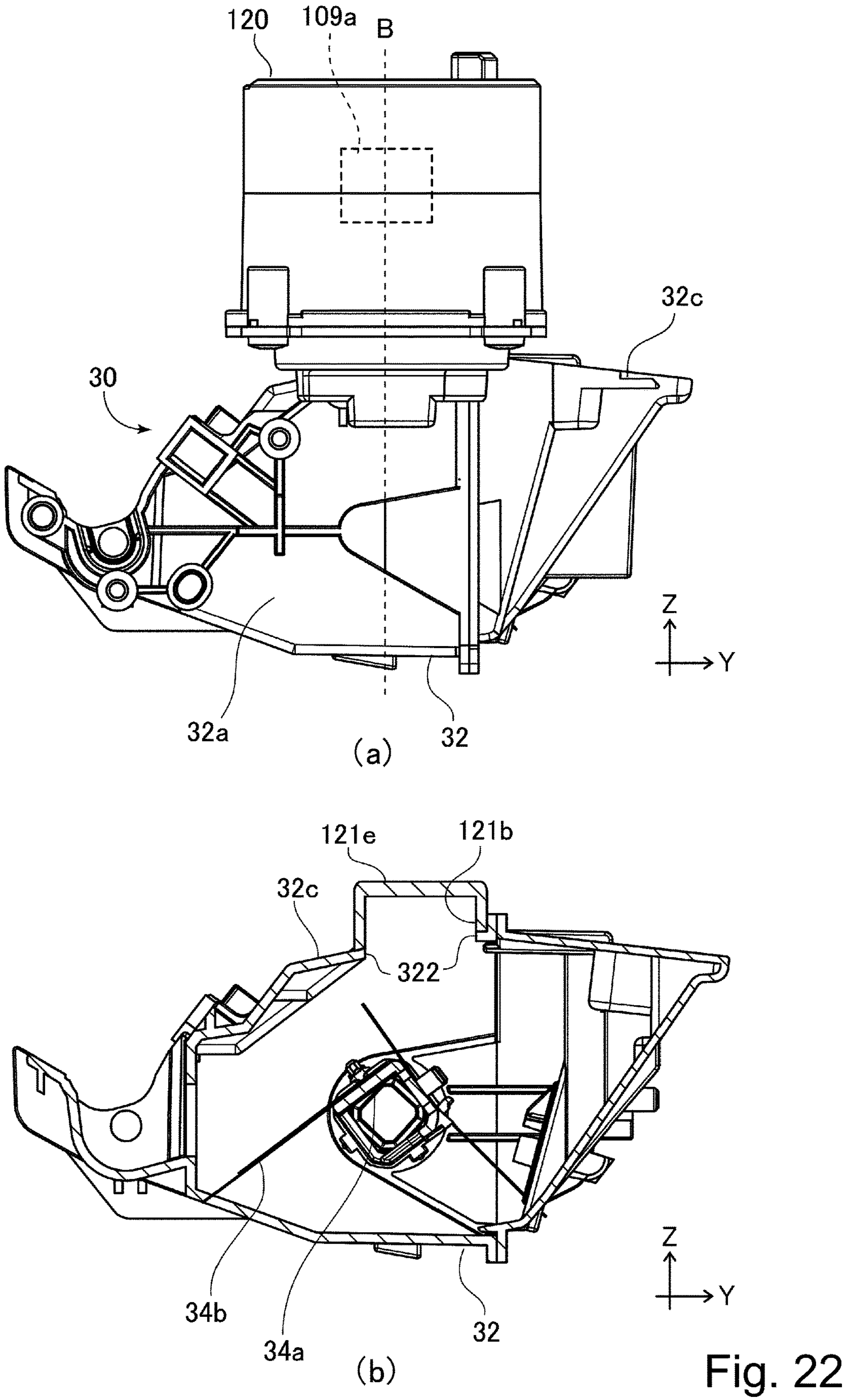
FIG. 22, part (a) and part (b), is a view for describing the developing device and the toner receiving device according to the Embodiment 2.
Figure 23:
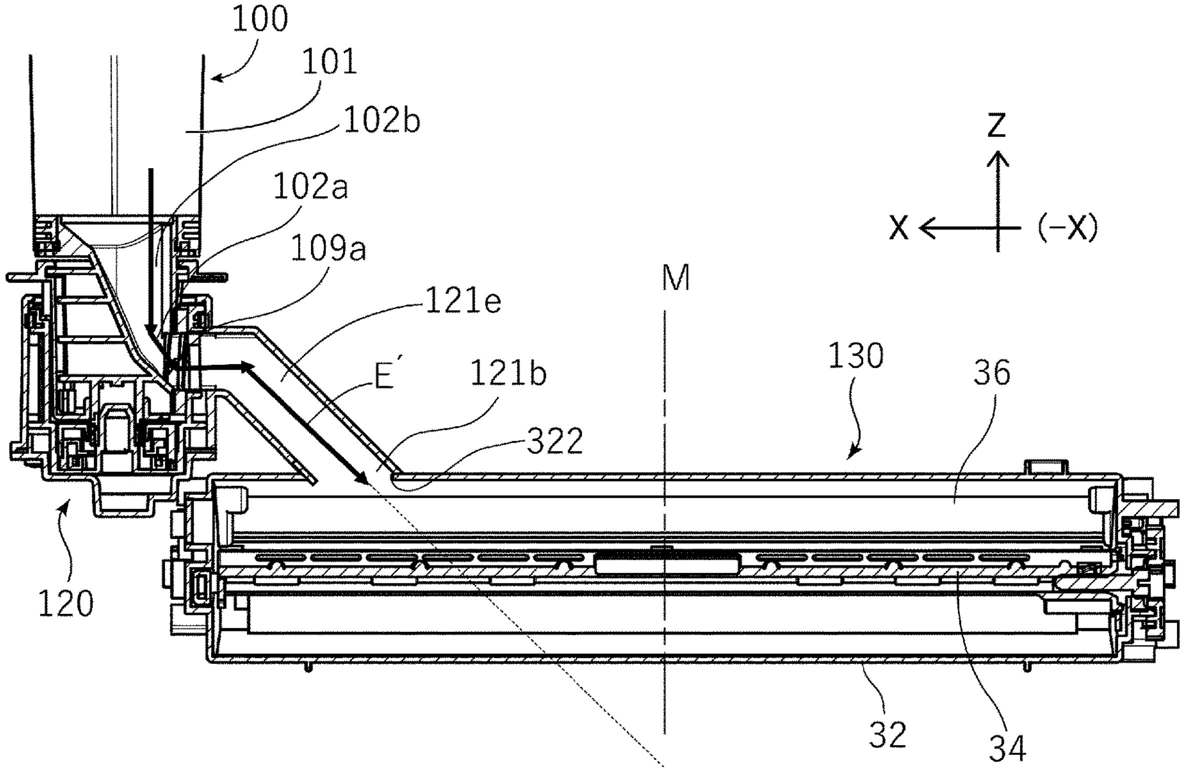
FIG. 23 is a cross-sectional view for describing the developing device and the toner receiving device according to the Embodiment 2.
Figure 24:
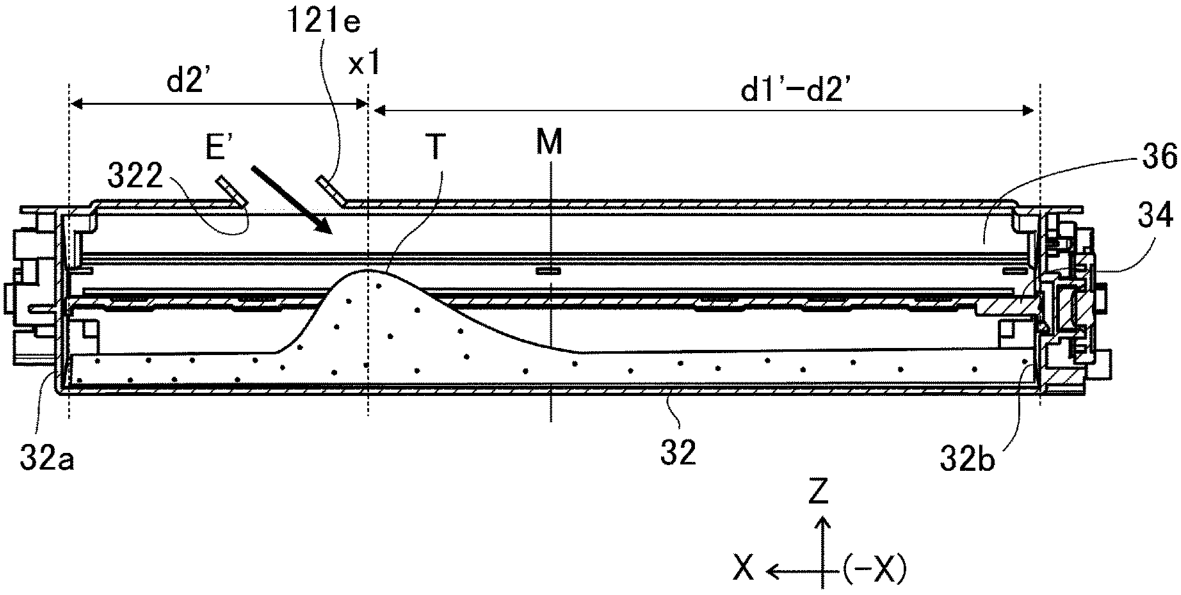
FIG. 24 is a view for describing a leveling of a toner surface in the Embodiment 2.

FIG. 19 is a perspective view of a toner receiving device 120 according to the present Embodiment. Part (a) and part (b) of FIG. 20 are perspective views of the toner receiving device 120 and a developing device 130 according to the present Embodiment. FIG. 21 is a top view of the toner receiving device 120 and the developing device 130. Part (a) of FIG. 22 is a side view of the toner receiving device 120 and the developing device 30 viewed from the first end side in the X direction (+X side). Part (b) of FIG. 22 is a cross-sectional view of the developing device 30 cut at a position indicated by a V-V line in FIG. 21. FIG. 23 is a cross-sectional view of the toner receiving device 120 and the developing device 130 cut with a X-Z plane. FIG. 24 is a cross-sectional view of the developing device 130 for describing an advantage of the present Embodiment. Incidentally, in each of the above Figures, the developing roller 31 and the operating lever 108 are omitted.

In the Embodiment 1, the configuration in which the toner receiving device 106 is adjacent to the developer container 32 in the X direction is described. In the present Embodiment, it is described that a configuration in which most of the toner receiving device 120 is positioned above the developer container 32, as shown in part (a) and part (b) of FIG. 20.

As shown in FIG. 19, the toner receiving device 120 includes a guide portion 121*e* which guides the toner received through the receiving opening 109*a* (first receiving opening, same as in the Embodiment 1) of the device-side shutter 109. The guide portion 121*e* is provided in the first frame 121. The first frame 121 has a shape of the first frame member 107 (FIG. 4) of the Embodiment 1 with an addition of the cylindrical guide portion 121*e* extended from the discharging opening 107*b* of the Embodiment 1. In addition, a discharging opening 121*b* of the toner receiving device 120 of the present Embodiment is provided at a leading end of the guide portion 121*e*. A configuration of the toner receiving device 120 other than the first frame 121 is the same as the configuration of the toner receiving device 106 of the Embodiment 1.

As shown in part (a) and part (b) of FIG. 20 and FIG. 21, the toner receiving device 120 is provided on the first end side of the developer container 32 in the X direction (+X side). In addition, as shown in part (a) of FIG. 22, the receiving opening 109*a* of the toner receiving device 120 and an opening of the guide portion 121*e* on a side of the receiving opening 109*a* are positioned above an upper surface portion 32*c* of the developer container 32.

As shown in part (b) of FIG. 22 and FIG. 23, in the upper surface portion 32*c* of the developer container 32, a receiving opening 322 (second receiving opening) which receives the toner discharged from the discharging opening 121*b* of the toner receiving device 120 in the toner accommodating chamber 36 is formed.

As shown in FIG. 23, the guide portion 121*e* extends from an outer circumferential portion of the first frame 121 to a second end side in the X direction and extends below toward the receiving opening 322. That is, at least a portion of the guide portion 121*e* (portion connected to the receiving opening 322) is inclined with respect to a horizontal plane as it extends below toward the second end side in the X direction. In other words, the guide portion 121*e* forms a flow passage which guides the toner flowing from the receiving opening 109*a* of the toner receiving device 120 toward the longitudinal center M of the toner accommodating chamber 36.

The inner space of the toner pack 100 and the toner accommodating chamber 36 are connected by a flow passage E' which includes the guide portion 121*e*. The flow passage E' includes the flow passage 102*b* and discharging opening 102*a* inside the nozzle 102 of the toner pack 100, the receiving opening 109*a*, the guide portion 121*e* and the discharge opening 121*b* of the toner receiving device 120, and the receiving opening 322 of the developer container 32.

In the present Embodiment, the toner receiving device 120 includes the receiving opening 109*a* (first receiving opening) for receiving the toner from the toner pack 100, and the developer container 32 includes the receiving opening 322 for receiving the toner in the developer container 32 through the receiving opening 109*a*. And in a state in which the toner can be replenished to the developer container 32 through the receiving opening 109*a* and the receiving opening 322 (in a state in which the device-side shutter 109 is positioned in the opening position), the receiving opening 109*a* and the receiving opening 322 are arranged as described below. That is, the receiving opening 109*a* of the toner receiving device 120 is positioned at the second end side in the X direction (−X side) with respect to the mounting space 106*a* in which the toner pack 100 is accommodated in the toner receiving device 120 (FIG. 23). The opening area of the receiving opening 109*a* when viewed in the X direction (FIG. 22) is wider than the opening area of the receiving opening 109*a* when viewed in the direction perpendicular to the X direction (FIG. 23). And the receiving opening 322 of the developer container 32 is positioned closer to the longitudinal center M of the developer container 32 with respect to the X direction than the receiving opening 109*a* of the toner receiving device 120.

In other words, in the present Embodiment as well, the mounting portion includes the first receiving opening for receiving the toner discharged from the replenishing container, and the accommodating portion includes the second receiving opening for receiving the toner flowed from the first receiving opening in the accommodating portion. In a state in which the toner is capable of being replenished to the accommodating portion through the first receiving opening and the second receiving opening, the first receiving opening is positioned on the second end side opposite to the first end side in the rotational axis direction of the developing roller with respect to the mounting space in which the replenishing container is mounted in the mounting portion. In addition, in the above state, the opening area of the first receiving opening when viewed in the rotational axial direction is wider than the opening area of the first receiving opening when viewed in a direction perpendicular to the rotational axial direction. Furthermore, in the above state, the second receiving opening is positioned on the second end side in the rotational axis direction than the first receiving opening and on the first end side in the rotational axis direction than the central position of the accommodating portion in the rotational axis direction.

According to the present configuration, a movement direction of the toner when the receiving opening 109*a* of the toner receiving device 120 receives the toner from the toner pack 100 becomes a direction facing toward a side of the longitudinal center M of the toner accommodating chamber 36 with respect to the X direction (the second end side of the rotational axis direction). And since the toner flows in the toner accommodating chamber 36 through the receiving opening 322 of the developer container 32, which is positioned on the second end side in the X direction than the receiving opening 109*a*, it becomes possible to flow the toner so as to be closer to the longitudinal center M in the toner accommodating chamber 36.

As shown in FIG. 24, according to the present Embodiment, the toner flowing in the toner accommodating chamber 36 through the receiving opening 109*a* and the receiving opening 322 is deposited at a position x1, which is closer to the longitudinal center M of the toner accommodating chamber 36 than the receiving opening 109*a*, which is positioned on the first end side in the X direction with respect to the developer container 32. A distance from an end portion of the first end side to an end portion of the second end side of the toner accommodating chamber 36 with respect to the X direction shall be defined as d1', and a distance from the end portion of the first end side of the toner accommodating chamber 36 to the above position x1 with respect to the X direction shall be defined as d2'. In this case, to spread the toner immediately after replenishment, which is deposited near the position X1, to the second end side of the toner accommodating chamber 36 with respect to the X direction, the toner should be conveyed only by a distance of (d1'-d2'). In other words, for example, a conveyance direction to spread the toner to the end portion of the second end side of the toner accommodating chamber 36 becomes shorter than in the configuration in which the toner immediately after replenishment is deposited near the end portion of the first end side of the toner accommodating chamber 36 in the X direction.

Therefore, even by the present Embodiment, it is possible to spread the toner, which is replenished from outside the image forming apparatus 1 in the developer container 32, quickly in the toner accommodating chamber 36.

In addition, in the present Embodiment, it is configured that the guide portion 121*e*, which connects the receiving opening 109*a* of the toner receiving device 120 with the receiving opening 322 of the developer container 32, to be inclined downwardly in the X direction as approaching the receiving opening 322. By this, in the configuration in which the receiving opening 109*a* of the toner receiving device 120 is positioned above the receiving opening 322 of the developer container 32, it becomes possible to deliver the toner to a vicinity of the longitudinal center M of the toner accommodating chamber 36 with respect to the X direction while moving the toner below toward the developer container 32.

Modified Examples

In the Embodiment 2, the configuration in which the guide portion 121*e* which connects the receiving opening 109*a* of the toner receiving device 120 and the receiving opening 322 of the developer container 32 is provided as a part of the toner receiving device 120 is described. Instead, the guide portion 121*e* may be configured as a portion of the developing device 30. For example, the guide portion 121*e* may be integrally molded of the same resin material as the developer container 32. In this case, the opening of the leading end (opposite side of the connecting portion with the developer container 32) of the guide portion 121*e* serves as a receiving opening for receiving the toner in the developer container 32. If the receiving opening is configured so that an opening area of the receiving opening when viewed in the X direction is wider than an opening area of the receiving opening when viewed in the direction perpendicular to the X direction, then the same advantages as the developing device of the Embodiment 1 can be obtained.

In addition, for example, instead of the configuration of the Embodiment 2, the toner receiving device 120 may be provided above the longitudinal center M of the toner accommodating chamber 36, and the toner may be replenished directly below. In this configuration as well, since the toner immediately after replenishment is deposited near the longitudinal center M of the toner accommodating chamber 36, by the toner being conveyed by the stirring member 34 to the first end side and the second end side in the X direction, it is possible to spread the toner quickly.

Other Embodiments

In each of the Embodiments described above, it is possible to use the developer device for a lifetime of the image forming apparatus by replenishing the toner using the replenishing container from outside the image forming apparatus while the developer device is mounted on the printer main assembly 2. However, even in these Embodiments, which employ the toner replenishing method, the developing device (or an entire process unit including the developing device) may be configured as a detachably mountable unit (cartridge) from the printer main assembly. In this case, it may be configured that the developer device is attached to and detached from the printer main assembly while the toner receiving device is fixed to the printer main assembly, or it may be configured that the developer device and the toner receiving device are attached to and detached from the printer main assembly as a single unit.

SUMMARY OF THE DISCLOSURE

The present disclosure includes at least the following structures.

(Structure 1)

A developing device for use with an image forming apparatus and to which a replenishing container for replenishing toner is detachably mountable, the developing device comprising:

an accommodating portion configured to accommodate the toner;

a developing roller configured to supply the toner in the accommodating portion to an image bearing member; and a stirring member configured to stir the toner in the accommodating portion, wherein the accommodating portion includes a receiving opening through which the toner replenished from the accommodating portion is received in the accommodating portion, the receiving opening being provide on a first end side of the accommodating portion with respect to a rotational axis direction of the developing roller, and wherein an opening area of the receiving opening in a case in which the developing device is viewed in the rotational axis direction is wider than the opening area of the receiving opening in a case viewed in a direction perpendicular to the rotational axis direction.

(Structure 2)

A developing device according to Structure 1, wherein the receiving opening is formed on a side surface of the first end side of the accommodating portion with respect to the rotational axis direction.

(Structure 3)

A developing device according to Structures 1 or 2, wherein the stirring member includes a shaft portion extending in the rotational axis direction, and a stirring portion projected from the shaft portion in a direction crossing to the rotational axis direction and configured to stir the toner in the accommodating portion with rotation of the shaft portion, and wherein the receiving opening is positioned above the shaft portion in a case viewed in the rotational axis direction.

(Structure 4)

A developing device according to Structure 3, wherein the stirring member includes an elastic sheet-like member extending in the rotational axis direction, and wherein a toner surface in the accommodating portion is leveled by the toner pressed by the sheet-like member flowing into a side where the toner is less with respect to the rotational axis direction with the rotation of the shaft portion.

(Structure 5)

A developing device according to any one of Structures 1 to 4, wherein the receiving opening is formed in a cylindrical shape extending along the rotational axis direction from an opening position outside of the accommodating portion to an opening position inside of the accommodating portion.

(Structure 6)

An image forming apparatus comprising:

an image bearing member;

a developing device according to any one of Structures 1 to 5, the developing device developing an electrostatic latent image formed on the image bearing member to a toner image; and a mounting portion configured to mount the replenishing container.

(Structure 7)

An image forming apparatus according to Structure 6, wherein the mounting portion includes a first receiving opening configured to receive the toner discharged from the replenishing container, and wherein the receiving opening of the accommodating portion is configured to communicate with the first receiving opening and is a second receiving opening for receiving the toner flowed from the first receiving opening in the accommodating portion.

(Structure 8)

An image forming apparatus according to Structure 7, wherein the first receiving opening and the second receiving opening are arranged in the rotational axis direction in a state in which the toner is capable of being replenished to the accommodating portion through the first receiving opening and the second receiving opening, and wherein when viewed in the rotational axis direction, an opening range of the first receiving opening and an opening range of the second receiving opening are overlapped.

(Structure 9)

An image forming apparatus according to Structure 8, wherein the mounting portion further includes a fixed member in which a discharging opening for discharging the toner toward the developing device is formed and fixed to a frame member of the image forming apparatus, and a shutter member formed with the first receiving opening and movable between an opening position where the first receiving opening communicates with the discharging opening and a closing position where the first receiving opening does not communicate with the discharging opening, and wherein in a case in which the shutter member is positioned in the opening position, the image forming apparatus is in a state in which the toner is capable of being replenished through the first receiving opening and the second receiving opening.

(Structure 10)

An image forming apparatus according to any one of Structures 6 to 9, wherein when viewed in the rotational axis direction, the mounting portion and the accommodating portion are overlapped.

(Structure 11)

An image forming apparatus to which a replenishing container for replenishing toner is detachably mountable, the image forming apparatus comprising:

a developing device including an accommodating portion configured to accommodate the toner, a developing roller configured to supply the toner in the accommodating portion to an image bearing member, and a stirring member configured to stir the toner in the accommodating portion; and a mounting portion provided on a first end side of the accommodating portion with respect to a rotational axis direction of the developing roller and configured to mount the replenishing container, wherein the mounting portion includes a first receiving opening for receiving the toner discharged from the replenishing container, wherein the accommodating portion includes a second receiving opening for receiving the toner flowed from the first receiving opening in the accommodating portion, and wherein in a state in which the toner is capable of being replenished to the accommodating portion through the first receiving opening and the second receiving opening, the first receiving opening is positioned on a second end side opposite to the first end side in the rotational axis direction with respect to a mounting space in which the replenishing container is mounted in the mounting portion, an opening area of the first receiving opening in a case viewed in the rotational axis direction is wider than an opening area of the first receiving opening in a case viewed in a direction perpendicular to the rotational axis direction, and the second receiving opening is positioned on the second end side in the rotational axis direction than the first receiving opening and on the first end side in the rotational axis direction than a central position of the accommodating portion in the rotational axis direction.

(Structure 12)

An image forming apparatus according to Structure 11, wherein the second receiving opening is formed on a side surface of the first end side of the accommodating portion with respect to the rotational axis direction.

(Structure 13)

An image forming apparatus according to Structure 12, wherein in a state in which the toner is capable of being replenished to the accommodating portion through the first receiving opening and the second receiving opening, the first receiving opening and the second receiving opening are arranged in the rotational axis direction, and an opening range of the first receiving opening and an opening range of the second receiving opening are overlapped when viewed in the rotational axis direction.

(Structure 14)

An image forming apparatus according to Structure 11, wherein the first receiving opening is provided above the second receiving opening, and wherein the image forming apparatus further comprises a guide portion configured to form a flow passage between the first receiving opening and the second receiving opening, the guide portion being inclined downwardly as approaching the second receiving opening in the rotational axis direction.

(Structure 15)

An image forming apparatus according to any one of Structures 11 to 14, wherein the stirring member includes a shaft portion extending in the rotational axis direction, and a stirring portion projected from the shaft portion in a direction crossing to the rotational axis direction and configured to stir the toner in the accommodating portion with rotation of the shaft portion, and wherein the second receiving opening is positioned above the shaft portion when viewed in the rotational axis direction.

(Structure 16)

An image forming apparatus according to any one of Structures 11 to 15, wherein the mounting portion further includes a fixed member in which a discharging opening for discharging the toner toward the developing device is formed and fixed to a frame member of the image forming apparatus, and a shutter member formed with the first receiving opening and movable between an opening position where the first receiving opening communicates with the discharging opening and a closing position where the first receiving opening does not communicate with the discharging opening, and wherein in a case in which the shutter member is positioned in the opening position, the image forming apparatus is in a state in which the toner is capable of being replenished through the first receiving opening and the second receiving opening.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-164341, filed on Oct. 12, 2022, which is hereby incorporated by reference herein in its entirety.

What is claimed is:

1. A developing device for use with an image forming apparatus and to which a replenishing container for replenishing toner is detachably mountable, the developing device comprising:

an accommodating portion configured to accommodate the toner;

a developing roller configured to supply the toner in the accommodating portion to an image bearing member; and a stirring member configured to stir the toner in the accommodating portion, wherein the accommodating portion includes a receiving opening through which the toner replenished from the replenishing container is received in the accommodating portion, the receiving opening being provide on a first end side of the accommodating portion with respect to a rotational axis direction of the developing roller, and wherein an opening area of the receiving opening in a case in which the developing device is viewed in the rotational axis direction is wider than the opening area of the receiving opening in a case viewed in a direction perpendicular to the rotational axis direction.

2. A developing device according to claim 1, wherein the receiving opening is formed on a side surface of the first end side of the accommodating portion with respect to the rotational axis direction.

3. A developing device according to claim 1, wherein the stirring member includes a shaft portion extending in the rotational axis direction, and a stirring portion projected from the shaft portion in a direction crossing to the rotational axis direction and configured to stir the toner in the accommodating portion with rotation of the shaft portion, and wherein the receiving opening is positioned above the shaft portion in a case viewed in the rotational axis direction.

4. A developing device according to claim 3, wherein the stirring member includes an elastic sheet-like member extending in the rotational axis direction, and wherein a toner surface in the accommodating portion is leveled by the toner pressed by the sheet-like member flowing into a side where the toner is less with respect to the rotational axis direction with the rotation of the shaft portion.

5. A developing device according to claim 1, wherein the receiving opening is formed in a cylindrical shape extending along the rotational axis direction from an opening position outside of the accommodating portion to an opening position inside of the accommodating portion.

6. An image forming apparatus comprising:

an image bearing member;

a developing device according to claim 1, the developing device developing an electrostatic latent image formed on the image bearing member to a toner image; and a mounting portion configured to mount the replenishing container.

7. An image forming apparatus according to claim 6, wherein the mounting portion includes a first receiving opening configured to receive the toner discharged from the replenishing container, and wherein the receiving opening of the accommodating portion is configured to communicate with the first receiving opening and is a second receiving opening for receiving the toner flowed from the first receiving opening in the accommodating portion.

8. An image forming apparatus according to claim 7, wherein the first receiving opening and the second receiving opening are arranged in the rotational axis direction in a state in which the toner is capable of being replenished to the accommodating portion through the first receiving opening and the second receiving opening, and wherein when viewed in the rotational axis direction, an opening range of the first receiving opening and an opening range of the second receiving opening are overlapped.

9. An image forming apparatus according to claim 8, wherein the mounting portion further includes a fixed member in which a discharging opening for discharging the toner toward the developing device is formed and fixed to a frame member of the image forming apparatus, and a shutter member formed with the first receiving opening and movable between an opening position where the first receiving opening communicates with the discharging opening and a closing position where the first receiving opening does not communicate with the discharging opening, and wherein in a case in which the shutter member is positioned in the opening position, the image forming apparatus is in a state in which the toner is capable of being replenished through the first receiving opening and the second receiving opening.

10. An image forming apparatus according to claim 6, wherein when viewed in the rotational axis direction, the mounting portion and the accommodating portion are overlapped.

11. An image forming apparatus to which a replenishing container for replenishing toner is detachably mountable, the image forming apparatus comprising:

a developing device including an accommodating portion configured to accommodate the toner, a developing roller configured to supply the toner in the accommodating portion to an image bearing member, and a stirring member configured to stir the toner in the accommodating portion; and a mounting portion provided on a first end side of the accommodating portion with respect to a rotational axis direction of the developing roller and configured to mount the replenishing container, wherein the mounting portion includes a first receiving opening for receiving the toner discharged from the replenishing container, wherein the accommodating portion includes a second receiving opening for receiving the toner flowed from the first receiving opening in the mounting portion, and wherein in a state in which the toner is capable of being replenished to the accommodating portion through the first receiving opening and the second receiving opening, the first receiving opening is positioned on a second end side opposite to the first end side in the rotational axis direction with respect to a mounting space in which the replenishing container is mounted in the mounting portion, an opening area of the first receiving opening in a case viewed in the rotational axis direction is wider than an opening area of the first receiving opening in a case viewed in a direction perpendicular to the rotational axis direction, and the second receiving opening is positioned on the second end side in the rotational axis direction than the first receiving opening and on the first end side in the rotational axis direction than a central position of the accommodating portion in the rotational axis direction.

12. An image forming apparatus according to claim 11, wherein the second receiving opening is formed on a side surface of the first end side of the accommodating portion with respect to the rotational axis direction.

13. An image forming apparatus according to claim 12, wherein in a state in which the toner is capable of being replenished to the accommodating portion through the first receiving opening and the second receiving opening, the first receiving opening and the second receiving opening are arranged in the rotational axis direction, and an opening range of the first receiving opening and an opening range of the second receiving opening are overlapped when viewed in the rotational axis direction.

14. An image forming apparatus according to claim 11, wherein the first receiving opening is provided above the second receiving opening, and wherein the image forming apparatus further comprises a guide portion configured to form a flow passage between the first receiving opening and the second receiving opening, the guide portion being inclined downwardly as approaching the second receiving opening in the rotational axis direction.

15. An image forming apparatus according to claim 11, wherein the stirring member includes a shaft portion extending in the rotational axis direction, and a stirring portion projected from the shaft portion in a direction crossing to the rotational axis direction and configured to stir the toner in the accommodating portion with rotation of the shaft portion, and wherein the second receiving opening is positioned above the shaft portion when viewed in the rotational axis direction.

16. An image forming apparatus according to claim 11, wherein the mounting portion further includes a fixed member in which a discharging opening for discharging the toner toward the developing device is formed and fixed to a frame member of the image forming apparatus, and shutter member formed with the first receiving opening and movable between an opening position where the first receiving opening communicates with the discharging opening and a closing position where the first receiving opening does not communicate with the discharging opening, and wherein in a case in which the shutter member is positioned in the opening position, the image forming apparatus is in a state in which the toner is capable of being replenished through the first receiving opening and the second receiving opening.

* * * * *